United States Patent
Mehansho et al.

(10) Patent No.: US 11,357,250 B2
(45) Date of Patent: *Jun. 14, 2022

(54) TREATMENT AND PREVENTION OF DIABETES AND OBESITY

(71) Applicant: Summit Innovation Labs, LLC, Norwood, OH (US)

(72) Inventors: Haile Mehansho, Hamilton, OH (US); Satyanarayana Majeti, Liberty Township, OH (US); Ghebre Egziabher Tzeghai, Wyoming, OH (US)

(73) Assignee: Summit Innovation Labs LLC, Norwood, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/674,876

(22) Filed: Aug. 11, 2017

(65) Prior Publication Data

US 2018/0042287 A1    Feb. 15, 2018

Related U.S. Application Data

(63) Continuation-in-part of application No. 15/649,084, filed on Jul. 13, 2017.
(Continued)

(51) Int. Cl.
*A23L 33/00* (2016.01)
*A23L 33/105* (2016.01)
(Continued)

(52) U.S. Cl.
CPC .............. *A23L 33/40* (2016.08); *A23L 33/105* (2016.08); *A23L 33/12* (2016.08); *A23L 33/15* (2016.08);
(Continued)

(58) Field of Classification Search
CPC .......... A23L 33/40; A23L 33/12; A23L 33/17; A23L 33/19; A23L 33/105; A23L 33/16;
(Continued)

(56) References Cited

U.S. PATENT DOCUMENTS 4,217,342 A * 8/1980 Gaffar ..................... A61K 8/19
424/48
5,849,337 A   12/1998 Dixon
(Continued)

FOREIGN PATENT DOCUMENTS

CN    1477959 A    2/2004
CN    1956734 A    5/2007
(Continued)

OTHER PUBLICATIONS

Ganio et al (Year: 2010).*
Vormann (Year: 2003).*
Khurana S, et al. (2013) Polyphenols: Benefits to the Cardiovascular System in Health and in Aging, Nutrients. 5 (10): 3779-3827.
Movahed, Ali, et al. (2013) Antihyperglycemic Effects of Short Term Resveratrol Supplementation in Type 2 Diabetic Patients, Hindawi Publishing Corporation Evidence-Based Complementary and Alternative Medicine, vol. 2013, Article ID 851267, 11pages.
Schurgers LJ, et al. (2007) Regression of Warfarin—Induced medical elastocalcinosis by high intake of Vitamin K in rats. Blood, 109: 2823-2831.
(Continued)

*Primary Examiner* — Jeffrey S Lundgren
*Assistant Examiner* — Ibrahim D Bori
(74) *Attorney, Agent, or Firm* — Dinsmore & Shohl LLP

(57) ABSTRACT

The invention encompasses compositions and methods for effectively treating and/or preventing diabetes and/or obesity. This is accomplished by totally addressing the multiple mechanisms that lead to such conditions. The invention includes compositions comprising a combination of agents that effectively suppress, regulate or interfere with the various biochemical processes and mechanisms that lead to diabetes and obesity. The inventive compositions used for administration to human and other mammalian subjects comprise (1) at least one agent capable of modulating expression and/or activity of one or more of peroxisome activated protein receptor gamma (PPAR-γ), CAAT/enhancer binding protein-α (C/EBPα) and Sterol Regulatory Element-Binding Protein (SREBP-1); (2) at least one agent capable of activating Wnt/β-catenin pathway; (3) at least one agent capable of activating the adenosine monophosphate-activated protein kinase (AMPK) signaling pathway; (4) at least one agent that inhibits the activity of pro-oxidants including reactive nitrogen species and reactive oxygen species (ROS); (5) at least one agent that suppresses one or more of inflammatory mediators including interleukins IL-1α, IL-1β, IL-6, NF-κB, TNF-α, matrix metalloproteinases (MMPs) and prostaglandin E2 (PGE2); (6) at least one agent capable of enhancing glucose transporter (GLUT4) and/or inhibiting glucose transporter GLUT2; (7) at least one agent that induces the expression of and/or activates adiponectin and (8) at least one agent that induces the expression of and/or activates sirtuin (SIRT1). The active agents for use herein are natural materials such as phytonutrients, vitamins and minerals. Compositions with combinations of such natural agents have the ability to prevent, reduce or treat diabetes and obesity by (a) clearing glucose and fatty acids from blood, (b) reducing the number of adipose cells and fat storage, (c) interfering with fat, glucose, and cholesterol biosynthesis, and (d) promoting fat and glucose oxidation.

Since the present compositions are aimed toward normalizing metabolism and energy expenditure and managing oxidative stress and inflammation, they are also beneficial in relation to physical activity, in particular performance, endurance, fatigue and recovery during intensive and continuous exercise/exertion.

12 Claims, No Drawings

Related U.S. Application Data

(60) Provisional application No. 62/374,983, filed on Aug. 15, 2016.

(51) Int. Cl.

| | | |
|---|---|---|
| *A23L 33/12* | (2016.01) | |
| *A23L 33/15* | (2016.01) | |
| *A23L 33/16* | (2016.01) | |
| *A23L 33/17* | (2016.01) | |
| *A23L 33/185* | (2016.01) | |
| *A23L 33/19* | (2016.01) | |

(52) U.S. Cl.
CPC .............. *A23L 33/16* (2016.08); *A23L 33/17* (2016.08); *A23L 33/185* (2016.08); *A23L 33/19* (2016.08); *A23L 33/00* (2016.08); *A23V 2002/00* (2013.01)

(58) Field of Classification Search
CPC ........ A23L 33/15; A23L 33/185; A23L 33/00; A23V 2002/00
See application file for complete search history.

(56) References Cited

U.S. PATENT DOCUMENTS

| | | | |
|---|---|---|---|
| 5,962,030 A | 10/1999 | Fine | |
| 6,210,701 B1* | 4/2001 | Darland | A61K 36/53 |
| | | | 424/439 |
| 9,138,453 B2 | 9/2015 | Zhao-Wilson | |
| 9,364,447 B2 | 6/2016 | Vermeer | |
| 9,788,560 B2 | 10/2017 | Toomey et al. | |
| 2006/0166948 A1 | 7/2006 | Vermeer | |
| 2007/0048296 A1 | 3/2007 | Kajander et al. | |
| 2008/0242690 A1 | 10/2008 | Tripp et al. | |
| 2009/0087501 A1* | 4/2009 | Cummins | A61K 36/15 |
| | | | 424/729 |
| 2010/0021533 A1* | 1/2010 | Mazed | A61K 36/54 |
| | | | 424/450 |
| 2012/0003378 A1 | 1/2012 | Howard | |
| 2012/0121730 A1* | 5/2012 | Singh | A61K 31/05 |
| | | | 424/682 |
| 2013/0017182 A1 | 1/2013 | Lukina | |
| 2013/0095201 A1* | 4/2013 | Bloom | A47J 43/20 |
| | | | 425/447 |
| 2015/0056176 A1 | 2/2015 | Jankowitz et al. | |
| 2015/0118304 A1 | 4/2015 | Cornblatt et al. | |
| 2015/0313892 A1* | 11/2015 | Singh | A61K 9/4808 |
| | | | 424/451 |
| 2016/0166631 A1 | 6/2016 | Liu | |
| 2016/0193306 A1 | 7/2016 | Rabovsky et al. | |
| 2017/0000856 A1 | 1/2017 | Holstein et al. | |

FOREIGN PATENT DOCUMENTS

| | | |
|---|---|---|
| CN | 101239168 A | 8/2008 |
| EP | 1728507 A1 | 12/2006 |
| EP | 2626077 A2 | 8/2013 |
| WO | 2004019923 A1 | 3/2004 |
| WO | 2006127996 | 11/2006 |
| WO | 2008006582 A1 | 1/2008 |
| WO | 2015176153 | 11/2015 |

OTHER PUBLICATIONS

Ahmed OM, et al. (2012). Antidiabetic Effects of Hesperidin and Naringin in Type 2 diabetic Rats. Diabetologia Creotica. 41: 53-67.
Rios JL, et al. (2015). Natural products for the treatment of Type 2 Diabetes Mellitus. Planta Med, 81:975-994.
Salim KS (2014). Hypoglycemic Property of Ginger and Green Tea and their Possible in Diabetes Mellitus. The Open Conference Proceedings Journal. 5: 13-19.
Nielsen FH (2010). Magnesium, inflammation, and obesity in chronic disease. Nutrition Reviews, 68:333-340.
Coughlan KA, et al. Diabetes, Metabolic Syndrome and Obesity: Targets and Therapy, https://doi.org/10.2147/DMSO.S43731.
Mereles D and Hunstein W (2011). Epigallocatechin-3-gallate (EGCG) for Clinical Trials: More Pitfall than Promise? Int J. Mol. Sci. 12: 5592-5603.
Wahab A, et al. (2017). Significance of Resveratrol in Clinical Management of Chronic Diseases. Molecules: 2017, 22, 1327; doi:10.3390/molecules22081329.
Chinese Office Aciton dated Jun. 16, 2021 in reference to Application No. 201780050345.X filed Jul. 24, 2017.
"How to make a pregnant woman happy" p. 189, released Feb. 28, 2006.
Chinese Office Aciton dated Jan. 14, 2022 in reference to Application No. 201780050345.X filed Jul. 24, 2017.

* cited by examiner

TREATMENT AND PREVENTION OF DIABETES AND OBESITY

CROSS REFERENCE TO RELATED APPLICATIONS

This application claims the benefit of U.S. Provisional Application No. 62/374,983 filed on Aug. 15, 2016 and U.S. Pat. No. 1,564,084 filed on Jul. 13, 2017.

FIELD OF THE INVENTION

The present invention relates to compositions and methods for the treatment and prevention of obesity, diabetes and associated conditions. The present compositions comprise combinations of select actives that provide additive or synergistic benefits for these conditions. Advantageously, these select actives include materials such as phytonutrients, vitamins and minerals that have been broadly used in food and drink products and are safe for human and pet/animal consumption.

BACKGROUND OF THE INVENTION

Diabetes and obesity are among the most prevalent and debilitating chronic diseases. The major causes of these health problems include high fat/carbohydrate consumption, sedentary life style, chronic stress and genetic susceptibility. [Hossain M K, et al. (2016), "Molecular Mechanisms of the anti-obesity and Anti-Diabetic Properties of Flavonoids". *Int. J. Mol. Sci.*, 17, 569]. Type 2 diabetes mellitus (T2DM) is a condition that disturbs the process by which the body metabolizes glucose. It is characterized by high glucose (hyperglycemia), high lipids (hyperlipidemia), impaired insulin secretion, and increased insulin resistance. The health consequences of T2DM include vascular calcification and heart disease, high blood pressure, kidney disease, blindness, foot amputation, skin infection and periodontal disease. [Mayo Clinic. 20033091. "Disease and Conditions: Diabetes"]

Similar to T2DM, obesity is a rapidly growing health problem in both developed and developing countries. Obesity is characterized by increased adipose cell numbers, tissue expansion and increased fat storage. Similar to T2DM, obesity is a rapidly growing health problem in both developed and developing countries. Obesity is characterized by increased adipose cell numbers, tissue expansion and increased fat storage. Furthermore, it has been repeatedly shown that obese persons compared to those with a normal or healthy weight, are at significantly increased risk for many serious diseases and health conditions and even higher mortality. These diseases and conditions include T2DM, cardiovascular diseases, hypertension, high LDL cholesterol, low HDL cholesterol, high levels of triglycerides (dyslipidemia), gallbladder disease, sleep apnea, breathing problems, osteoarthritis, body pain, difficulty with physical functioning, some cancers, mental illness and overall low quality of life. [*Centers for Disease Control and Prevention.* "The Health Effects of Overweight and Obesity".]

Therefore, there is a critical need for therapeutic and preventive compositions and methods against diabetes and obesity. Furthermore, since diabetes and obesity are associated with and significantly increase the risk for many other serious diseases and are prevalent among all ages, their control, prevention and reversal are urgent and key clinical needs in overall human health and healthcare, and importantly to address the enormous cost associated with such healthcare.

SUMMARY OF THE INVENTION

The invention encompasses compositions and methods for effectively treating and/or preventing diabetes and/or obesity. This is accomplished by totally addressing the multiple mechanisms that lead to such conditions. The invention includes compositions comprising a combination of agents that effectively suppress, regulate or interfere with the various biochemical processes and mechanisms that lead to diabetes and obesity. The inventive compositions used for administration to human and other mammalian subjects comprise (1) at least one agent capable of modulating expression and/or activity of one or more of peroxisome activated protein receptor gamma (PPAR-γ), CAAT/enhancer binding protein-α (C/EBPα) and Sterol Regulatory Element-Binding Protein (SREBP-1); (2) at least one agent capable of activating Wnt/β-catenin pathway; (3) at least one agent capable of activating the adenosine monophosphate-activated protein kinase (AMPK) signaling pathway; (4) at least one agent that inhibits the activity of pro-oxidants including reactive nitrogen species and reactive oxygen species (ROS); (5) at least one agent that suppresses one or more of inflammatory mediators including interleukins IL-1α, IL-1β, IL-6, NF-κB, TNF-α, matrix metalloproteinases (MMPs) and prostaglandin E2 (PGE2); (6) at least one agent capable of enhancing glucose transporter (GLUT4) and/or inhibiting glucose transporter GLUT2; (7) at least one agent that induces the expression of and/or activates adiponectin and (8) at least one agent that induces the expression of and/or activates sirtuin (SIRT1). The active agents for use herein are natural materials such as phytonutrients, vitamins and minerals. It is to be understood that any one of these agents may provide multiple activities or functions; thus in some embodiments the present combinations may comprise less than eight (8) different agents. Compositions with combinations of such natural agents have the ability to prevent, reduce or treat diabetes and obesity by (a) clearing glucose and fatty acids from blood, (b) reducing the number of adipose cells and fat storage, (c) interfering with fat, glucose, and cholesterol biosynthesis, and (d) promoting fat and glucose oxidation.

DETAILED DESCRIPTION OF THE INVENTION

All percentages used herein are by weight of the composition, unless otherwise specified. The ratios used herein are molar ratios of the overall composition, unless otherwise specified. All measurements of e.g., weights, pH values, etc. are made at 25° C. with standard equipment, unless otherwise specified.

As used in this disclosure and the appended claims, the singular forms "a," "an" and "the" include plural referents unless the context clearly dictates otherwise. As used herein, "about" is understood to refer to numbers in a range of numerals. Moreover, all numerical ranges herein should be understood to include all integers, whole or fractions, within the range. The compositions disclosed herein may lack any element that is not specifically disclosed herein. Herein, "comprising" and its variants mean that other steps and other ingredients which do not affect the end result can be added. The terms encompass the terms "consisting of" and "consisting essentially of". Thus, the disclosure of an embodiment using the term "comprising" includes a disclosure of an embodiment "consisting essentially" of and an embodiment "consisting" of the referenced components. Any embodiment disclosed herein can be combined with any other embodiment disclosed herein.

As used herein, the word "include," and variants, are intended to be non-limiting, such that recitation of items in a list is not to the exclusion of other like items that may also be useful in the materials, compositions, devices, and methods of this invention.

As used herein, the words "preferred", "preferably" and variants refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the terms "prevent", "prevention" and variants includes reduction of risk and/or severity of vascular calcification and/or any other referenced condition. The terms "treatment", "treat", "ameliorate" and "alleviate" include both prophylactic or preventive treatment (that prevent and/or slow the development of a targeted pathologic condition or disorder) and curative, therapeutic or disease-modifying treatment, including therapeutic measures that cure, slow down, lessen symptoms of, and/or halt progression of a diagnosed pathologic condition or disorder; and treatment of patients at risk of contracting a disease or suspected to have contracted a disease, as well as patients who are ill or have been diagnosed as suffering from a disease or medical condition. The term does not necessarily imply that a subject is treated until total recovery. The terms "treatment" and "treat" also refer to the maintenance and/or promotion of health in an individual not suffering from a disease but who may be susceptible to the development of an unhealthy condition. The terms "treatment," "treat" and "to alleviate" are also intended to include the potentiation or otherwise enhancement of one or more primary prophylactic or therapeutic measures. The terms "treatment," "treat" and "alleviate" are further intended to include the dietary management of a disease or condition or the dietary management for prophylaxis or prevention a disease or condition. A treatment can be patient- or doctor-related.

As used herein, a "therapeutically effective amount" is an amount that prevents a deficiency, treats a disease or medical condition in an individual or, more generally, reduces symptoms, manages progression of the diseases or provides a nutritional, physiological, or medical benefit to the individual. The therapeutically effective amount that is required to achieve a therapeutic effect will, of course, vary with the particular composition, the route of administration, the age and the condition of the recipient, and the particular disorder or disease being treated.

By "safe and effective amount" as used herein means a sufficient amount of an active agent to provide the desired benefit while being safe and will vary with the particular condition being treated, the age and physical condition of the patient being treated, the severity of the condition, the duration of treatment, the nature of concurrent therapy, the specific form of the agent(s) employed, and the particular vehicle from which the agent(s) are applied.

As used herein, "animal" includes, but is not limited to, mammals, which includes but is not limited to, domestic animals such as dogs and cats, farm animals such as sheep, pigs, cows and horses, and humans. Where "animal," "mammal" or a plural thereof is used, these terms also apply to any animal that is capable of the effect exhibited or intended to be exhibited by the context of the passage. As used herein, the term "patient" is understood to include an animal, especially a mammal, and more especially a human that is receiving or intended to receive treatment, as treatment is herein defined. While the terms "individual" and "patient" are often used herein to refer to a human, the present disclosure is not so limited. Accordingly, the terms "individual" and "patient" refer to any animal, mammal or human, having or at risk for a medical condition that can benefit from the treatment.

The term "phytonutrients" or "phytochemicals" are used herein to denote natural chemical compounds that are found in many plant foods and refers to any compound produced by a plant that imparts one or more health benefits to the user. "Phyto" refers to the Greek word for plant. These chemicals help protect plants from germs, fungi, bugs, and other threats.

The terms, "food product", "food composition", "nutritional composition", "dietary supplement" and variants as used herein, are understood to include any number of optional additional ingredients, including conventional additives, for example, one or more proteins, carbohydrates, fats, vitamins, minerals, acidulants, thickeners, buffers or agents for pH adjustment, chelating agents, colorants, emulsifiers, excipients, flavoring and sweetening agents, osmotic agents, preservatives, stabilizers, sugars, sweeteners, and/or texturizers, acceptable excipients and/or carriers for oral consumption. The optional ingredients can be added in any suitable amount.

The term "carriers" refer to one or more compatible solid or liquid excipients or diluents which are suitable for oral administration and consumption. By "compatible," as used herein, is meant that the components of the composition are capable of being commingled without interaction in a manner which would substantially reduce the composition's stability and/or efficacy. Suitable excipient and/or carriers for ingestible products include maltodextrin, calcium carbonate, dicalcium phosphate, tricalcium phosphate, microcrystalline cellulose, dextrose, rice flour, magnesium stearate, stearic acid, croscarmellose sodium, sodium starch glycolate, crospovidone, vegetable gums, lactose, methyl cellulose, povidone, carboxymethyl cellulose, corn starch, and the like (including mixtures thereof). Preferred carriers include calcium carbonate, magnesium stearate, maltodextrin, and mixtures thereof.

Suitable flavoring agents include oil of wintergreen, oil of peppermint, oil of spearmint, clove bud oil, menthol, anethole, methyl salicylate, eucalyptol, *cassia*, 1-menthyl acetate, sage, eugenol, parsley oil, oxanone, alpha-irisone, marjoram, lemon, orange, propenyl guaethol, cinnamon, vanillin, thymol, linalool, cinnamaldehyde glycerol acetal known as CGA, and mixtures thereof.

Sweetening agents which can be used include sucrose, glucose, saccharin, dextrose, levulose, lactose, mannitol, sorbitol, fructose, maltose, xylitol, saccharin salts, thaumatin, aspartame, D-tryptophan, dihydrochalcones, acesulfame and cyclamate salts, especially sodium cyclamate and sodium saccharin, and mixtures thereof.

The compositions of the present invention may be in various forms including ingestible solid forms such as capsules, tablets, pills, gummies, gelcaps, or granules and powder such as teas and drink mixes. The compositions may also be prepared as a liquid solution, emulsion, concentrate, gel, and the like for beverage and like products.

The present compositions may also be prepared for use in topical applications such as for the oral cavity, skin, hair, scalp and nails. By "topical composition", "oral, hair, skin, scalp or nail care composition" as used herein means products which in the ordinary course of usage are not intentionally swallowed for purposes of systemic administration of particular therapeutic agents, but are rather retained in the oral cavity or other body surfaces/tissues for a time sufficient to contact substantially all such dental, mouth, skin, scalp, hair or nail surfaces and/or tissues to deliver the intended benefits.

The topical oral care composition of the present invention may be in various forms including toothpaste, dentifrice, tooth powder, topical oral gel, mouthrinse, denture product, mouthspray, mousse, foam, lozenge, oral tablet, and chewing gum. Examples of composition forms for the care of the skin, scalp, hair or nail include lotions, creams, gels, cleansers, scrubs, shampoos, rinses, rinse-off or leave-in conditioners, mousses, hairsprays, ointments, tinctures and salves. Carriers and excipients for these topical products are well known in the art. For example, conventional additives in oral care compositions include but are not limited to fluoride ion sources; anti-calculus or anti-tartar agents; antimicrobial agents such as stannous salts, cetyl pyridinium chloride (CPC), flavor oils and others; buffers; abrasives such as silica; bleaching agents such as peroxide sources; alkali metal bicarbonate salts; thickening materials; humectants; water; surfactants; titanium dioxide; flavor system; sweetening agents; xylitol; coloring agents, and mixtures thereof.

For pet and animal care, the present compositions may be formulated for example as tablets, foods, chews and toys. The active agent(s) may be incorporated for example, into a relatively supple but strong and durable material such as rawhide, ropes made from natural or synthetic fibers, and polymeric articles made from nylon, polyester or thermoplastic polyurethane. As the animal chews, licks or gnaws the product, incorporated active agents are released into the animal's oral cavity and ingested. In pet food embodiments, the active agent(s) may be incorporated as an ingredient or admixed into a pet food such as for example, a kibbled, semi-moist, or canned food. The present compositions may also be incorporated into other pet care products including nutritional supplements and drinking water additives.

The various ingredients and the excipient and/or carrier are mixed and formed into the desired form using conventional techniques. For example, the tablet or capsule of the present invention may be coated with an enteric coating that dissolves at a pH of about 5.0 to 9.0. Suitable enteric coatings that dissolve at a higher pH in intestine but not in the stomach include cellulose acetate phthalate, phospholipid bilayers and others. Further materials are well known in the art and are readily chosen by one skilled in the art based on the physical, aesthetic and performance properties desired for the compositions being prepared. Details on techniques for formulation and administration may be found in *Remingtons' Pharmaceutical Sciences* (18th Edition, 1990); *Cosmetic and Toiletry Formulations* (2$^{nd}$ Edition, 1989); *The International Cosmetic Ingredient Directory and Handbook* (8$^{th}$ Edition, 2000).

Active and other ingredients useful herein may be categorized or described herein by their therapeutic and/or nutritional benefit or their postulated mode of action or function. However, it is to be understood that the active and other ingredients useful herein can, in some instances, provide more than one therapeutic benefit or function or operate via more than one mode of action. Therefore, classifications herein are made for the sake of convenience and are not intended to limit an ingredient to the particularly stated application or applications listed.

Obesity and diabetes are closely related and their development is physiologically and metabolically regulated involving different tissues (intestine, liver, heart, muscle, adipose and pancreas) and multiple inter-related mechanisms. Conditions including (1) enhancement of intestinal glucose absorption, (2) reduction of glucose and fat uptake by muscle and heart, acceleration of lipid synthesis and storage in adipose tissue, (3) an increase in the number of adipocytes (fat cells), and (4) slowing thermogenesis all promote both diabetes and obesity. In contrast, conditions that (1) inhibit glucose absorption, (2) promote glucose and fat uptake by muscle and heart tissues, (3) suppress fat, cholesterol and glucose synthesis by the liver, (4) reduce the number of adipocytes, and (5) promote thermogenesis are beneficial in treating or preventing diabetes and obesity. [See e.g., Wang S, et al. (2014). "Novel insights of dietary polyphenols and obesity". *J. Nutr. Biochem.*, 25(1): 1-18; Centers for Disease Control and Prevention. "The Health Effects of Overweight and Obesity"; Aguirre L, et al (2011), "Beneficial Effects of Quercetin on Obesity and Diabetes". *The Open Nutraceuticals Journal,* 4: 189-198; Zhang D, et al. (2013), "Curcumin and Diabetes: A Systematic Review". *Evidence Based Complementary and Alternative Medicine;* 2013/636053; Babu P V A, et al. (2013), "Recent Advances in Understanding the Anti-Diabetic Actions of Dietary Flavonoids". *J. Nutr. Biochem.* 2013.06.003.]

The metabolic processes that are characteristic of or that lead to the comorbid conditions of obesity and diabetes involve a number of inter-related factors and mechanisms, the most significant of which are believed to be (1) peroxisome activated protein receptor gamma (PPAR-$\gamma$), CAAT/enhancer binding protein-$\alpha$ (C/EBP$\alpha$) and Sterol Regulatory Element-Binding Proteins (SREBP-1); (2) signaling pathways including Wnt/$\beta$-catenin and adenosine monophosphate-activated protein kinase (AMPK); (3) pro-oxidants including reactive nitrogen species and reactive oxygen species (ROS); (4) inflammatory mediators including interleukins IL-1$\alpha$, IL-1$\beta$, IL-6, NF-$\kappa$B, TNF-$\alpha$, matrix metalloproteinases (MMPs) and prostaglandin E2 (PGE2); (5) glucose transporters (GLUT4 and GLUT2; (6) adiponectin and (7) sirtuin (SIRT1).

Obesity results from the growth and expansion of adipose tissue in which lipid storage and energy metabolism are tightly controlled. Adipocytes, also known as lipocytes or fat cells, are the cells that primarily compose adipose tissue. Adipose tissue growth involves an increase in adipocyte size and the formation of new adipocytes from precursor mesenchymal stem cells. Adipogenesis is the process of cell differentiation by which the precursor cells, preadipocytes, become mature adipocytes that are specialized in the synthesis (manufacture) and storage of fat. Adipocytes are important to the body in maintaining proper energy balance, storing calories in the form of lipids, mobilizing energy sources in response to hormonal stimulation, and commanding changes by signal secretions.

AMPK is a metabolic master switch that regulates downstream signals based on shifts in the surrounding energy reservoir. It is expressed in a number of tissues, including adipose tissue, kidney, liver, skeletal muscle, and hypothalamus of the brain. It is activated when adenosine triphosphate (ATP) consumption causes an increase in the adenosine monophosphate (AMP)-to-ATP ratio. On activation, AMPK signals through its downstream substrates to achieve energy homeostasis by stimulating processes that generate ATP through such actions as fatty acid oxidation and glucose transport, while inhibiting those that use ATP through the opposing actions of fatty acid synthesis and protein synthesis. Thus, the net effect of AMPK activation is an increased cellular energy level via the inhibition of anabolic energy-consuming pathways, as well as the stimulation of catabolic, energy-producing pathways. Activation of AMPK down-regulates the enzymes involved in fatty acid metabolism resulting in inhibition of lipid accumulation in adipocytes. AMPK also regulates the ligand-activated transcriptional factors PPAR-γ and CCAAT/enhancer binding protein-α (C/EBPα), which are the central regulators of adipogenesis and lipid storage in adipocytes. C/EBPα and PPAR-γ, are induced early during adipocyte differentiation. Another transcription factor induced very early during adipocyte differentiation is sterol regulatory element binding protein-1c (SREBP-1c)/adipocyte determination and differentiation factor 1 (ADD1), a protein that is involved in cholesterol metabolism and also participates in adipocyte gene expression.

Beyond energy homeostasis, AMPK plays a major role in glucose homeostasis by modulating glucose transport in peripheral tissues. Skeletal muscle, one of the main peripheral tissues involved in glucose uptake and disposal, expresses glucose transporter type 4 (GLUT4). In hyperglycemia, insulin promotes the translocation of intracellular vesicular GLUT4 to the cell membrane, thereby increasing glucose uptake in the muscle. AMPK activation contributes to glucose transport in a similar way as insulin. The result is AMPK-induced glucose uptake stimulation in skeletal cells, with increased expression of enzymes specialized in glucose uptake such as GLUT4 and hexokinase II. Moreover, AMPK directly phosphorylates the GLUT4 enhancer factor that is essential in the regulation of GLUT4 expression. Hexokinase phosphorylates glucose entering the cell, allowing for a structural change that prevents glucose from leaving the cell in the first step of glycolysis. Overall, these sequential alterations in the expression of enzymes involved in glucose uptake are the ultimate result of AMPK activation, which stimulates catabolic processes that counter the deleterious effects of glucose excess and maintains energy homeostasis. [See e.g., Hardie D G. et al. (2012), "AMPK: a nutrient and energy sensor that maintains energy homeostasis". *Nat. Rev. Mol. Cell Biol.* 12; 13:251-262; Hardie D G, et al. (2003), "Management of cellular energy by the AMP-activated protein kinase system". *FEBS Lett.* 546:113-120; Jensen T E, et al. (2014), "Contraction-stimulated glucose transport in muscle is controlled by AMPK and mechanical stress but not sarcoplasmatic reticulum $Ca^{2+}$ release". *Mol. Metab.* 3:742-753]

The growth and expansion of adipose tissues, similar to the growth of cancerous tumors, requires angiogenesis, i.e., recruitment of new blood vessels to provide oxygen and nutrients to adipocytes, which are expanding in both size and numbers. In adipose tissue, this is mediated by adipose tissue secretion of hormones and adipokines, including adiponectin, leptin, resistin, visfatin, tumor necrosis factor-α, interleukin-6, interleukin-1, and vascular endothelial growth factor (VEGF). Of these, adiponectin, also known as adipocyte complement-related protein of 30 kDa (Acrp30) along with inflammatory mediators such as tumor necrosis factor (TNF-α) and interleukin 6 (IL-6) have been shown among the most biologically relevant to obesity and diabetes.

Adiponectin (APN) is abundantly produced and secreted by adipose tissues and widely recognized for its antidiabetic, anti-inflammatory, antiatherogenic, and cardioprotective effects. Expression of APN and its circulating levels are significantly decreased in conditions of obesity, insulin resistance, hyperinsulinemia, T2DM and lipid abnormalities, which are all associated with low-grade chronic inflammation. It is has been suggested that the absence of APN anti-inflammatory effects may be a contributing factor to this inflammation. APN inhibits the expression of tumor necrosis factor-α-induced endothelial adhesion molecules, macrophage-to-foam cell transformation, tumor necrosis factor-α expression in macrophages and adipose tissue, and smooth muscle cell proliferation. APN also has anti-apoptotic and anti-oxidant effects, which play a role in its cardioprotective action. Molecular mechanisms of APN may be direct actions on inflammatory cells suppressing reactive oxygen species and stimulating the expression of the anti-inflammatory IL-10 cytokine, suppression of the NF-κB inflammatory signaling pathway, and downregulation of inflammatory responses involving TNF-α.

APN exhibits key metabolic functions on skeletal muscle and liver mediated via AMP kinase (AMPK) and peroxisome proliferator-activated receptor α (PPARα). In muscle, APN enhances insulin sensitivity; in liver, APN activates glucose transport, inhibits gluconeogenesis, activates fatty acid oxidation and decreases inflammation. In pancreas, APN acts on cell proliferation stimulating insulin secretion. In adipose tissues, APN increases basal glucose uptake and enhances insulin-stimulated glucose uptake through AMPK activation. In addition, in vitro studies have demonstrated that APN regulates fat lipid metabolism by inhibiting lipolysis. [See e.g., Ejaz A, et al. (2009), "Curcumin Inhibits Adipogenesis in 3T3-L1 Adipocytes and Angiogenesis and Obesity in C57/BL Mice J. Nutr. 139(5): 919-925; Rosen E D and Spiegelman B M. (2001), "PPARgamma: a nuclear regulator of metabolism, differentiation, and cell growth. J. Biol. Chem.; 276:37731-4;] Gregoire F M, et al. (1998), "Understanding Adipocyte Differentiation". Physiological Review, 78(3):783-809; Brown M S and Goldstein J L (1997), "The SREBP pathway: regulation of cholesterol metabolism by proteolysis of a membrane-bound transcription factor". Cell, 89:331-340; Kern P A, et al. (1995), "The expression of tumor necrosis factor in human adipose tissue. Regulation by obesity, weight loss, and relationship to lipoprotein lipase". J. Clin. Invest. 95:2111-2119; Spiegelman B M (1996), "ADD1/SREBP1 promotes adipocyte differentiation and gene expression linked to fatty acid metabolism". Genes Dev. 10:1096-1107; Nigro E, et al. (2014), "New Insight into Adiponectin Role in Obesity and Obesity-Related Diseases". *BioMed Research International*, 14 pages, 2014/658913; Lu H L, et al. (2006), "Roles of adipocyte derived hormone adiponectin and resistin in insulin resistance of type 2 diabetes" *World J. Gastroenterol.* 12(11):1747-51; Villarreal-Molina M T and Antuna-Puente B. (2012), "Adiponectin: anti-inflammatory and cardioprotective effects". *Biochimie.* 94(10):2143-2149.]

Therefore, in addition to reducing nutrient/energy intake, the keys to lowering growth of adipose tissue, lowering body weight gain and thus, obesity are the inhibition of angiogenesis in adipose tissue along with reducing adipocyte numbers by decreasing adipogenesis or differentiation of preadipocytes to adipocytes, and reducing accumulation of lipids and fat content in adipocytes and liver. The factors that regulate these key processes include the AMPK pathway; the transcriptional factors PPAR-γ, C/EBPα, and SREBP-1c; and adipokines, in particular adiponectin and inflammatory mediators such as tumor necrosis factor (TNF-α) and interleukin 6 (IL-6).

Diabetes, especially T2DM, shares with obesity the same problem of imbalance between energy/nutrient intake and expenditure. In T2DM, consumption of processed, high-calorie foods, along with physical inactivity, has created this imbalance. This disruption of energy balance is characterized by shifts in lipid and glucose metabolism manifesting as fasting and postprandial hyperglycemia together with high lipids (hyperlipidemia), impaired insulin secretion, and increased insulin resistance (IR). T2DM and hyperglycemia result from (1) increased absorption of glucose from foods, (2) too much glucose release into the circulation system by the liver, (3) failure of the pancreas to produce enough insulin, (4) a reduction of glucose uptake by muscle, heart and adipose cells due to insulin resistance, and (5) an increase in fat accumulation (31). The overall process in T2DM share with obesity multiple regulatory factors and mechanisms discussed above. Additional factors include the following.

Glucose Transporters:

Glucose transporter type 4 (GLUT4), also known as solute carrier family 2, facilitated glucose transporter member 4 is the insulin-regulated glucose transporter protein found primarily in adipose tissues and striated muscle. GLUT4 is a major mediator of glucose removal from the circulation and functions as a key regulator of whole body glucose homeostasis. It prevents/reduces T2DM by increasing glucose uptake by these cells. The stimulation of glucose uptake requires translocation of GLUT4 protein from intracellular storage sites to the cell surface. At the cell surface, GLUT4 permits the facilitated diffusion of circulating glucose down its concentration gradient into muscle and fat cells. Once within cells, glucose is rapidly phosphorylated by glucokinase in the liver and hexokinase in other tissues to form glucose-6-phosphate, which then enters glycolysis or is polymerized into glycogen.

Glucose transporter 2 (GLUT2) also known as solute carrier family 2 (facilitated glucose transporter is a transmembrane carrier protein that enables protein facilitated glucose movement across cell membranes. GLUT2 has been demonstrated to be the dominant intestinal sugar transporter when intestinal glucose concentrations are high, i.e., after ingestion of food. GLUT2 activity increases glucose level in the circulation system from ingested foods and beverages. Thus, inhibition of GLUT2 activity would provide two key benefits: reduction of postprandial hyperglycemia in diabetic subjects and in subjects with mild glucose intolerance; and reduction of the total amount of glucose absorbed as a caloric and weight reduction strategy. [See e.g. Vinayagam R and Xu B (2015). "Antidiabetic properties of dietary flavonoids: a cellular mechanism review". *Nutrition & Metabolism* 12:60; Aguirre L, et al (2011), "Beneficial Effects of Quercetin on Obesity and Diabetes. *The Open Nutraceuticals Journal*, 4:189-198; Kwon 0, et al. (2007), "Inhibition of the intestinal glucose transporter GLUT2 by flavonoids". *The FASEB Journal*, 21(2) 366-377; Huang S and Czech M P (2007), "The GLUT4 glucose transporter". *Cell Metab.* 5, 237-252.]

Nuclear Receptors:

Peroxisome proliferator-activated receptors (PPARs) belong to a subfamily of the nuclear receptor superfamily of ligand-inducible transcription factors. Three PPAR isotypes encoded by separate genes have been identified, PPAR-α, PPAR-β/δ, and PPAR-γ. PPARs mainly control the expression of gene networks involved in adipogenesis, lipid metabolism, inflammation, and the maintenance of metabolic homeostasis. As they can be activated by dietary fatty acids and their metabolites, they act as lipid sensors that, upon activation, are able to markedly redirect metabolism. PPAR-γ is particularly involved in the regulation of insulin sensitivity, inflammation, fatty acid storage, glucose metabolism as well as adipocyte differentiation as discussed above. PPAR-γ is essential for adipocyte differentiation, being induced during the differentiation of preadipocytes into adipocytes, which promotes obesity. Adipose tissue is also the primary tissue responsible for the insulin-sensitizing effect of PPAR-γ agonists or ligands. PPAR-γ controls the expression of numerous factors secreted from adipose tissue that influence insulin sensitivity positively (e.g., adiponectin and leptin) or negatively (e.g., resistin, tumor necrosis factor-α). In addition, PPAR-γ can directly modulate the expression of genes involved in glucose homeostasis, e.g., it upregulates glucose transporter type 4 (Glut4), which is critical for clearing glucose from the blood. In vivo animal studies have also demonstrated that activation of PPAR-γ by binding with natural product ligands decreased blood glucose levels in diabetic KKAy mice with simultaneous suppression of weight gain.

Thus, agents capable of modulating PPAR-γ activity, specifically PPAR-γ agonists or ligands, are believed to be beneficial against diabetes and obesity. Indeed a number of in vivo studies suggest that some of the natural product activators of PPAR-γ (e.g., magnolol, honokiol, amorfrutin 1, amorfrutin B, resveratrol, amorphastilbol) improve metabolic parameters in diabetic animal models, with reduced side effects in comparison to synthetic agonists such as TZDs. PPARγ-ligands have been identified in plants that are common food sources, including the tea plant (*Camellia sinensis*), soybeans (*Glycine max*), palm oil (*Elaeis guineensis*), ginger (*Zingiber officinale*), grapes and wine (*Vitis vinifera*), and a number of culinary herbs and spices (e.g. *Origanum vulgare, Rosmarinus officinalis, Salvia officinalis, Thymus vulgaris*) [See e.g., Tontonoz P. and Spiegelman B M. (2008), "Fat and beyond: the diverse biology of PPAR-gamma". *Annu. Rev. Biochem.* 77:289-312; Na H K and Surh Y J (2003), "Peroxisome proliferator-activated receptor gamma (PPARgamma) ligands as bifunctional regulators of cell proliferation". *Biochem. Pharmacol.* 66: 1381-1391; Heikkinen S, et al. (2007), "PPARgamma in human and mouse physiology". *Biochim. Biophys. Acta*, 1771:999-1013; Wang L, et al. (2014), "Natural product agonists of peroxisome proliferator-activated receptor gamma (PPARγ): a review". *Biochem. Pharmacol.* 92:73-89; Picard F and Auwerx J (2002), "PPAR(gamma) and glucose homeostasis". *Ann. Rev. Nutr.* 22:167-197; Ahmadian M, et al. (2013), "PPARgamma signaling and metabolism: the good, the bad and the future". *Nat. Med.* 19:557-566; Sugii S, et al. (2009), "PPARγ activation in adipocytes is sufficient for systemic insulin sensitization". *Proc. Natl. Acad. Sci. USA.* 0.106: 22504-22509; Christensen K B, et al. (2009), "Identification of plant extracts with potential antidiabetic properties: effect on human peroxisome proliferator-activated receptor (PPAR), adipocyte differentiation and insulin-stimulated glucose uptake". *Phytother. Res.* 23(9):1316-25.]

Transcription Factors:

As discussed above in relation to obesity, CCAAT-enhancer-binding proteins (C/EBPs, in particular C/EBPα) are required both for adipogenesis and for normal adipocyte function. Ectopic expression of C/EBPα in various fibroblast cell lines promotes adipogenesis. It has been suggested that C/EBPα probably promotes adipogenesis by inducing the expression of PPAR-γ. Sterol regulatory element-binding proteins-1c (SREBP-1c) also induce adipogenesis and regulate multiple genes involved in cholesterol biosynthesis and uptake. Control of cholesterol biosynthesis is necessary so as to produce the required amounts of cholesterol without risking overproduction. Such control is important because a sufficient of cholesterol must be supplied for many cellular functions. However, excess cholesterol must be avoided because it forms solid crystals that kill cells. Excess cholesterol in the bloodstream is also lethal because it deposits in arteries, initiating atherosclerosis. End-product regulation of cholesterol metabolism is achieved predominantly through repression of transcription of genes that govern the synthesis of cholesterol and its receptor-mediated uptake from plasma lipoproteins.

Enzymes:

Sirtuin (SIRT1) and 5' AMP-activated protein kinase (AMPK) play important roles in (a) clearing glucose and fatty acids from blood by stimulating fatty acid and glucose uptake in muscle and heart, (b) increasing thermogenesis by inducing enzymes that facilitate oxidation of fat and glucose in tissues including muscle, heart and liver (c) inhibiting synthesis of glucose, fat and cholesterol in the liver, and (d) suppressing adipogenesis and fat synthesis in fat cells by suppressing the expression PPAR-γ and C/EBPα, key inducers of adipogenesis. [See e.g., Vinayagam R and Xu B (2015), Ibid; Nogueiras R, et al. (2012). "Sirtuin 1 and Sirtuin 3: Physiological Modulators of Metabolisms". *Physiol. Rev.* 92: 1479-1514; Li X and Karzagan N (2011). "Mammalian Sirtuins and Energy Metabolism". *Int. J. Biol. Sci.* 7: 575-587]

5' adenosine monophosphate-activated protein kinase (AMPK) is an enzyme that plays a principal role in cell growth and cellular energy homeostasis, in relevant tissues. AMPK has come to be known as a master regulator of metabolism. It is expressed in a number of tissues, including the liver, heart, adipose, pancreas, brain, and muscle. AMPK activation has effects on these tissues. In skeletal muscles, its activation stimulates glucose uptake, FA oxidation, glucose transporter type 4 (GLUT4) translocation, and mitochondrial biogenesis, while inhibiting protein and glycogen synthesis. Similarly, in cardiac muscle, AMPK activation stimulates glucose uptake, FA oxidation, and glycolysis. AMPK stimulates glucose uptake and FA oxidation in liver, while inhibiting gluconeogenesis, as well as cholesterol, FA, and protein synthesis. In adipose tissue, it stimulates FA oxidation and reduces FA synthesis and lypolysis. AMPK modulates insulin secretion from pancreatic β-cells, and it signals to increase food intake in the hypothalamus. There is substantial evidence demonstrating that dysregulation of AMPK is a key component of the development of metabolic syndrome and T2DM. AMPK has been shown to regulate the coordination of anabolic processes, with its activation (physiological or pharmacological) resulting in improved insulin sensitivity, glucose and lipid homeostasis and thus, metabolic health. Thus, agents capable of activating AMPK would have beneficial against obesity and T2DM. [See e.g., Jeon, S M (2016). "Regulation and function of AMPK in physiology and diseases.". *Experimental & molecular medicine.* 48 (7); Hardie D G, et al. (2012) "AMPK: a nutrient and energy sensor that maintains energy homeostasis". *Nat. Rev. Mol. Cell Biol.* 13:251-262; Coughlan K A, et al. (2014), "AMPK activation: a therapeutic target for type 2 diabetes?". *Diabetes Metab Syndr Obes.* 7: 241-253; Ruderman N B, et al. (2013), "AMPK, insulin resistance, and the metabolic syndrome". *J. Clin. Invest.* 123(7):2764-2772; Bandyopadhyay G K, et al. (2006), "Increased malonyl-CoA levels in muscle from obese and type 2 diabetic subjects lead to decreased fatty acid oxidation and increased lipogenesis; thiazolidinedione treatment reverses these defects". *Diabetes.* 55(8):2277-2285; Xu X J, et al. "Insulin sensitive and resistant obesity in humans: AMPK activity, oxidative stress, and depot-specific changes in gene expression in adipose tissue". *J. Lipid Res.* 53(4):792-801.]

Sirtuin 1 (SIRT1) is the most conserved mammalian NAD+-dependent protein deacetylase that has emerged as a key metabolic sensor in various metabolic tissues. In response to different environmental stimuli, SIRT1 directly links the cellular metabolic status to the chromatin structure and the regulation of gene expression, thereby modulating a variety of cellular processes such as energy metabolism and stress response. Recent studies have shown that SIRT1 controls both glucose and lipid metabolism in the liver, promotes fat mobilization and stimulates brown remodeling of the white fat in white adipose tissue, controls insulin secretion in the pancreas, senses nutrient availability in the hypothalamus, influences obesity-induced inflammation in macrophages, and modulates the activity of circadian clock in metabolic tissues. Due to its ability to modify and control numerous transcription factors and co-factors involved in systemic metabolic homeostasis, SIRT1 is increasingly referred to as a master metabolic regulator like AMPK. [See e.g., Chalkiadaki A, Guarente L. (2012), "High-fat diet triggers inflammation-induced cleavage of SIRT1 in adipose tissue to promote metabolic dysfunction. Cell Metab. 16:180-188; Xiaoling Li (2013), "SIRT1 and energy metabolism". *Acta Biochim. Biophys. Sin (Shanghai).* 45(1): 51-60; Yoshizaki T, et al. (2009), "SIRT1 exerts anti-inflammatory effects and improves insulin sensitivity in adipocytes". *Mol. Cell Biol.* 29:1363-1374; Yoshizaki T, et al. (2010), "SIRT1 inhibits inflammatory pathways in macrophages and modulates insulin sensitivity". *Am. J. Physiol. Endocrinol. Metab.* 298:E419-E428; Rodgers J T, et al. (2005), "Nutrient control of glucose homeostasis through a complex of PGC-1alpha and SIRT1". *Nature.* 434:113-118; Liu Y, et al. (2008), "A fasting inducible switch modulates gluconeogenesis via activator/coactivator exchange". *Nature.* 456:269-273; Purushotham A, et al. (2009), "Hepatocyte-specific deletion of SIRT1 alters fatty acid metabolism and results in hepatic steatosis and inflammation". *Cell Metab.* 9:327-338; Dominy J E Jr, et al. (2010), "Nutrient-dependent regulation of PGC-1alpha's acetylation state and metabolic function through the enzymatic activities of Sirt1/GCN5". *Biochim. Biophys. Acta.* 2010; 1804:1676-1683].

As shown in recent reports, SIRT1 is an important regulator of glucose and lipid metabolism in the liver. Hepatic SIRT1 is a key modulator of gluconeogenesis in response to fasting. Prolonged fasting increases SIRT1 activity resulting in increased fatty acid oxidation and improved glucose homeostasis. SIRT1 also regulates hepatic cholesterol and bile acid homeostasis. In adipose tissues, SIRT1 has been shown to be an important modulator of maturation and remodeling. Adipose tissues originate from the differentiation of lipoblasts, and one of the primary factors involved in adipose tissue differentiation is the nuclear receptor PPAR-γ. SIRT1 has been shown to repress PPAR-γ in white adipose tissue, thereby suppressing the expression of adipose tissue markers. Furthermore, genetic ablation of SIRT1 in adipose tissues has been shown to lead to increased adiposity and insulin resistance.

SIRT1 also functions as a key transcriptional regulator of inflammation. Macrophage activation and infiltration into resident tissues is known to mediate local inflammation and is a hallmark of metabolic syndrome. This local inflammation has been increasingly recognized as a causal factor leading to the development of the cluster of diseases including T2DM and obesity surrounding metabolic syndrome. SIRT1 has been identified as an important repressor of inflammation in multiple tissues/cells including the macrophage. For example, in mice, modest overexpression of SIRT1 leads to suppression of the inflammatory response, whereas whole-body insufficiency of SIRT1 induces systemic inflammation upon high-fat diet challenge. Furthermore, deletion of SIRT1 in hepatocytes results in increased local inflammation under high-fat diet]. Several recent studies indicate that the beneficial effect of SIRT1 on metabolic disorders is due in part to its ability to suppress the activity of NF-κB, the master regulator of cellular inflammatory response in macrophages.

The important roles that SIRT1 plays in metabolism, inflammation, and circadian rhythm in various metabolic organs strongly suggest that SIRT1 is vital in regulation of whole-body insulin sensitivity, a physiological condition that is tightly associated with development of metabolic syndrome, a cluster of metabolic abnormalities including obesity, type 2 diabetes, dyslipidemia, fatty liver, and a pro-inflammatory and prothrombotic state. SIRT1 has been shown to directly regulate pancreatic insulin secretion, which in turn helps to improve systemic insulin sensitivity. Moreover, SIRT1 can improve systemic insulin sensitivity through interaction with AMP-activated protein kinase (AMPK), another essential metabolic sensor. In addition, it has been shown that SIRT1 directly regulates the secretion of adiponectin from adipocytes, which can then help to improve insulin sensitivity in the liver and muscle.

Therefore, SIRT1 is an essential regulator of systemic energy homeostasis, and pharmacological modulation of SIRT1 or use of molecular activators would be beneficial against obesity and T2DM and the other diseases associated with metabolic syndrome.

Signaling Pathways:

Wnt/β-catenin signaling involves secreted Wnt proteins that regulate developmental and metabolic processes among others and is thus relevant to the development of both obesity and T2DM. For example, this signaling pathway has been shown to enhance insulin signaling in insulin-responsive cell types, suggesting that Wnt proteins may be used to modulate glucose homeostasis in mammals and other organisms. Specifically, it leads to upregulation of glucose transporters in the cell membrane in order to increase glucose uptake from the bloodstream. This process is partially mediated by activation of Wnt/β-catenin signaling, which can increase a cell's insulin sensitivity. In particular, Wnt10b is a Wnt protein that increases this sensitivity in skeletal muscle cells. Wnt/β-catenin signaling also suppresses adipogenesis and fat/cholesterol biosynthesis. Wnt signaling maintains preadipocytes in an undifferentiated state through inhibition of the adipogenic transcription factors CCAAT/enhancer binding protein a (C/EBPα), SREBP-1c and peroxisome proliferator-activated receptor γ (PPAR-γ). When Wnt signaling in preadipocytes is prevented, these cells differentiate into adipocytes. Disruption of Wnt signaling also causes transdifferentiation of myoblasts into adipocytes in vitro, highlighting the importance of this pathway not only in adipocyte differentiation but also in mesodermal cell fate determination [See e.g., Abiola M, et al. (2009). "Activation of Wnt/β-Catenin Signaling increases Insulin Sensitivity through a reciprocal Regulation of Wnt10b and SREBP-1c in Skeletal Muscle Cells". *PLOS One*, 4 (12) e8509, 1-14; Christodoulides C, et al. (2009). "Adipogenesis and WNT signaling". *Trends Endicrinol. Metab.* 20: 16-24; Yoon, J C, et al. (2010), "Wnt signaling regulates mitochondrial physiology and insulin sensitivity". *Genes Dev.* 24(14): 1507-1518; Ross, S, et al. (2000), "Inhibition of Adipogenesis by Wnt Signaling". *Science*, 289(5481): 950-953.]

Adipokine:

Adiponectin (APN) is a protein hormone which is exclusively secreted from adipose tissue into the bloodstream and is abundant in plasma relative to many hormones. APN modulates a number of metabolic processes including glucose regulation and fatty acid oxidation. APN induces expression of AMPK that promotes fat oxidation and suppresses biosynthesis of fat, glucose and cholesterol in both skeletal muscle and heart. APN promotes insulin sensitivity thereby reducing blood glucose levels. The expression and activity of APN are discussed above in relation to obesity. The role of APN in inflammation and oxidative stress is discussed below.

Inflammation and Oxidative Stress:

Several studies have shown a strong association among obesity, altered redox state and inflammation; these studies have also shown that such alterations may be the link between obesity and obesity-related diseases (including Type 2 diabetes, cardiovascular disease, non-alcoholic fatty liver disease and cancer). Obese subjects usually show high levels of reactive oxygen or nitrogen species, impaired antioxidant defenses and increased levels of inflammatory adipokines. Oxidative stress (OS) is a result of excessive fat accumulation, but it has also been shown that oxidative stress, per se, leads to weight gain; therefore, it is not easy to establish the correct cause-effect relationship between obesity and oxidative stress.

As discussed above, the central factor in the pathophysiology of obesity is the expansion of visceral adipose tissue induced by overconsumption of nutrients. The increase in obesity-associated OS has been thought to be due to the presence of excessive adipose tissue itself, because adipocytes and preadipocytes have been identified as a source of proinflammatory cytokines; thus, obesity is considered a state of chronic inflammation. As visceral fat stores expand, adipocytes generate increasing levels of reactive oxygen species (ROS) that incite increased expression and secretion of inflammatory adipokines including tumor necrosis factor-alpha (TNF-α), interleukin-6, and interleukin-1. Other adipokines expressed in adipose tissue that play a role in inflammation and oxidative stress as well as homeostasis of various physiological processes include resistin, leptin, and adiponectin. Oxidative stress leads to insulin resistance within adipose tissue as well as in peripheral tissues. Insulin resistance is one of the hallmarks of obesity and accounts for many of its comorbidities, including T2DM and hypertension. Accumulation of oxidative stress in adipose tissue is one of the early events in the development of metabolic syndrome in obesity. Adipose tissue also has the secretory capacity of angiotensin II, which stimulates nicotinamide adenine dinucleotide phosphate (NADPH) oxidase activity. NADPH oxidase is a major contributor to oxidative stress in many tissues, including adipose tissue and the vasculature. However, factors causing oxidative stress, such as angiotensin II, that induce insulin resistance do not necessarily induce body weight gain. A study reported in 2014 by Youn, et al. demonstrated that ROS of vascular origin play an important causal role in the development of obesity. They hypothesize that ROS generated in vascular smooth muscle cells (VSMCs) by NADPH oxidase induce obesity. Based on this study, it is proposed that oxidative stress contributes to obesity rather than the other way around, as has been the conventional thinking. Whether oxidative stress and inflammation are cause or effect, it is believed that their control would be beneficial steps toward treating and/or preventing obesity and its comorbidities. [See e.g., Otani H (2011), "Oxidative stress as pathogenesis of cardiovascular risk associated with metabolic syndrome". *Antioxid. Redox Sig-* nal. 15:1911-1926; DeMarco V G, et al. (2010), "Cytokine abnormalities in the etiology of the cardiometabolic syndrome". *Curr. Hypertens. Rep.* 12:93-98; Keaney J F, Jr. et al. (2003), "Obesity and systemic oxidative stress: clinical correlates of oxidative stress in the Framingham Study". *Arterioscler. Thromb. Vasc. Biol.* 23:434-439; Aroor A R and DeMarco V G (2014), "Oxidative Stress and Obesity: The Chicken or the Egg?" *Diabetes.* 63(7):2216-2218; Youn J-Y, et al. (2014), "Role of vascular oxidative stress in obesity and metabolic syndrome". *Diabetes.* 63:2344-2355; Fernandez-Sanchez A, et al. (2011). "Inflammation, Oxidative Stress, and Obesity". *Int. J. Mol. Sci.* 12(5): 3117-3132; Houstis N, et al. (2006), "Reactive oxygen species have a causal role in multiple forms of insulin resistance". *Nature.* 440(7086):944-8.]

Leptin is a hormone secreted mainly by adipocytes in direct proportion to the mass of adipose-tissue, triglyceride (TG) content and the nutritional condition. Leptin inhibits lipogenesis and stimulates lipolysis, reducing intracellular lipid levels in skeletal muscle, liver, and pancreatic beta cells, thereby improving insulin sensitivity. Obesity is associated with increased leptin levels. Because the concentration of circulating leptin diminishes under fasting or caloric restriction conditions and increases in response to food intake, it has been postulated that the main determinant of leptin secretion may be glucose metabolism. Leptin has also been shown to promote oxidative stress and vascular inflammation. In inflammation, leptin acts directly on macrophages to increase phagocytic activity, and proinflammatory cytokine production also exerts an effect on T-cells, monocytes, neutrophils, and endothelial cells. When leptin is administered, increased levels of C-reactive protein (CRP) are produced, thus proving its inflammatory effect. When there is weight loss, circulating levels of leptin are reduced, and in turn, these levels reduce the plasma levels of obesity-associated inflammatory markers.

TNF-$\alpha$ is involved in the systemic inflammatory response and has been linked with the development of insulin resistance, obesity, and diabetes. It is produced mainly by monocytes, lymphocytes, adipose tissue, and muscle and its irregular production participates in the pathogenesis of the obesity-associated insulin resistance. TNF-$\alpha$ activity increases the release of free fatty acids (FFA) in adipocytes; it blocks the synthesis of adiponectin, which possesses insulin-sensitizing activity in high concentrations in adipose tissue, and it interferes with the activity of tyrosine-residue phosphorylation activity in the first substrate of the insulin receptor, which is necessary for progression of the intracellular signal of the hormone.

Interleukin 6 (IL-6) exerts many effects, ranging from defense to inflammation and tissue damage. Circulating levels of IL-6 correlate with BMI, insulin resistance, and intolerance to carbohydrates. IL-6 also antagonizes the secretion of adiponectin and has been shown in animal model to enhance gluconeogenesis and glycogenolysis and to inhibit glycogenesis.

Adiponectin (APN) is a protein whose expression and secretion is unique to differentiated adipocytes and has regulatory actions on energy homeostasis, glucose and lipid metabolism, and anti-inflammatory action. In contrast to other adipokines, adiponectin expression and plasma concentrations are not increased, but are rather decreased in a wide variety of diseases presenting insulin resistance and obesity. High levels of APN are related with weight loss and, in addition, adiponectin improves insulin sensitivity, decreases the flow of free fatty acids and increases their oxidation, inhibits major gluconeogenic liver enzymes, reduces hepatic release of glucose and muscle, and stimulates glucose utilization and fatty acid oxidation. Adiponectin shows high anti-inflammatory and antiatherogenic powers because it inhibits the adhesion of monocytes to endothelial cells, the transformation of macrophages into foam cells and endothelial cell activation, inhibits TNF-$\alpha$ expression, decreases CRP levels, and increases nitric oxide (NO) production in endothelial cells. Its globular isoform inhibits cell proliferation and production of ROS induced by low-density lipoprotein (LDL) oxidase during atheromatous plaque formation. In general, adiponectin deficiency results in NO reduction in the vascular walls and promotes leukocyte adhesion, causing chronic vascular inflammation. Finally, it has been observed that TNF-$\alpha$ and IL-6 are potent inhibitors of adiponectin expression and secretion.

Hence, the present invention is based on delineating the significant factors, metabolic processes and mechanisms that trigger obesity and T2DM and identifying the combination of actives that regulates these factors and processes to treat and/or prevention these conditions. The present invention uses a combination of natural active agents that in concert effectively and safely regulate the key factors and processes involved in diabetes and obesity as opposed to previous treatment approaches that are focused on treating individual factors or stimuli with specific drugs (for example, using metformin for diabetes; thiazide diuretics and beta-blockers for hypertension; nonsteroidal and steroidal anti-inflammatory drugs for inflammation, and statins for high cholesterol). For the treatment of patients suffering from T2DM, oral anti-hyperglycemic pharmaceuticals that have been used include synthetic sulfonylureas (to increase insulin secretion); biguanides (as insulin sensitizers; e.g., metformin), alpha-glucosidase inhibitors (to slow the digestion of starch in the small intestine); meglitinides and dipeptidylpeptidase 4 (DPP-4) inhibitors (to increase insulin secretion); and thiazolidinediones (TZDs, as agonists of PPAR-$\gamma$). In other words previous approaches are not holistic. Furthermore, the treatment drugs currently used to treat these chronic diseases do have side effects that could be detrimental to the overall health of the patient using them. For example, the TZD troglitazone was removed from the market because it induced severe to fatal hepatotoxicity that outweighed its benefits for patients with diabetes. Another TZD, rosiglitazone, was taken off the market in the European Union following a European Medicines Agency (EMA) recommendation for suspension of the marketing authorizations (press release 23rd of September 2010: EMA/585784/2010). In the United States, rosiglitazone is still in use, although according to the officially released Food and Drug Administration (FDA) Drug Safety Communication (from Nov. 25, 2013) "some scientific uncertainty about the cardiovascular safety of rosiglitazone medicines still remains". Safety concerns have also been raised about pioglitazone, another TZD, in relation to congestive heart failure and bladder cancer, leading to safety warnings and drug withdrawal in parts of Europe. [See e.g., Kung J and Henry R R (2012), "Thiazolidinedione safety". *Expert Opin. Drug Saf.* 11:565-579; Graham D J, et al. (2010), "Risk of acute myocardial infarction, stroke, heart failure, and death in elderly Medicare patients treated with rosiglitazone or pioglitazone". *J. Am. Med. Assoc.* 304:411-418; Lincoff A M, et al. (2007), "Pioglitazone and risk of cardiovascular events in patients with type 2 diabetes mellitus: a meta-analysis of randomized trials". *J. Am. Med. Assoc.* 298:1180-1188; Azoulay L, et al. (2012) "The use of pioglitazone and the risk of bladder cancer in people with type 2 diabetes: nested case-control study". *Br. Med. J.* 344:e3645; Neumann A, et al. (2012), "Pioglitazone and risk of bladder cancer among diabetic patients in France: a population-based cohort study". *Diabetologia.* 55:1953-1962.]

In one embodiment, the present compositions comprise combinations of select actives that provide additive or synergistic benefits for treating and/or preventing obesity and T2DM. Advantageously, these actives are natural products including phytonutrients, minerals and vitamins that are safe for consumption. The benefit from these combinations of actives results from holistically addressing the multiple factors and mechanisms that lead to obesity and T2DM.

The inventive compositions for administration to human and other mammalian subjects having or at risk for developing obesity and/or T2DM comprise (1) at least one agent capable of modulating expression and/or activity of one or more of peroxisome activated protein receptor gamma (PPAR-γ), CAAT/enhancer binding protein-α (C/EBPα) and sterol regulatory element-binding protein (SREBP-1); (2) at least one agent capable of activating the Wnt/β-catenin signaling pathway; (3) (2) at least one agent capable of activating adenosine monophosphate-activated protein kinase (AMPK) and its signaling pathway; (4) at least one agent that inhibits the activity of pro-oxidants including reactive nitrogen species and reactive oxygen species (ROS); (5) at least one agent that suppresses one or more of inflammatory mediators including interleukins IL-1α, IL-1β, IL-6, NF-κB, TNF-α, matrix metalloproteinases (MMPs) and prostaglandin E2 (PGE2); (6) at least one agent capable of enhancing glucose transporter (GLUT4) and/or inhibiting glucose transporter GLUT2; (7) at least one agent that induces the expression of and/or activates adiponectin and (8) at least one agent that induces the expression of and/or activates sirtuin (SIRT1). In a first embodiment, the active agents used in the present compositions are natural products, specifically phytonutrients, minerals and/or vitamins that have a long history of safety for human and mammalian consumption. It is to be understood that any one of these active agents may provide multiple activities or functions; thus in some embodiments the present combinations may comprise less than eight different agents. Preferably the present compositions comprise at least three phytonutrients, four phytonutrients, five phytonutrients and even six or more phytonutrients in various embodiments. One embodiment of the present invention is a dietary/nutritional supplement specifically formulated for controlling weight gain and T2DM. Tables 1 and 2 below show examples of such dietary supplements comprising phytonutrients and magnesium (Mg) as actives with mg amounts per serving shown.

TABLE 1

Dietary Supplements

| Actives (units) | I | II | III | IV | V | VI | VII |
| --- | --- | --- | --- | --- | --- | --- | --- |
| Quercetin (mg) | 50 | 30 | 30 | 30 | 30 | 30 | 30 |
| Curcumin (mg) | 100 | 60 | 50 | 50 | 50 | 50 | 50 |
| Magnesium (mg) | 200 | 200 | 200 | 200 | 200 | 200 | 200 |
| Resveratrol (mg) | 200 | 150 | 150 |  | 150 | 100 | 50 |
| Hesperidin (mg) |  | 150 |  |  |  | 100 | 50 |
| Oleuropein (mg) |  |  | 100 | 100 |  | 100 | 50 |
| Berberine (mg) |  |  |  | 150 |  |  | 100 |
| *Acacia* Polyphenol (mg) |  |  | 100 |  | 250 | 250 |  |
| EGCG (mg) |  |  |  |  |  | 200 | 100 |
| *Salacia* (mg) |  |  | 200 |  |  |  |  |

TABLE 2

Dietary Supplement Compositions

| Actives (units) | Formula 1 | Formula 2 | Formula 3 | Formula 4 | Formula 5 |
| --- | --- | --- | --- | --- | --- |
| Hesperidin (mg) | 250 |  |  |  |  |
| Magnesium (mg) | 200 | 300 | 200 | 200 | 300 |
| Curcumin (mg) | 500 | 500 | 500 | 500 | 500 |
| Amorfrutin 1 (mg) |  | 75 | 75 |  |  |
| Quercetin (mg) | 100 | 100 | 100 | 100 | 100 |
| Magnolol (mg) |  | 200 | 200 | 200 |  |
| Vitamin K2 (µg) | 180 |  | 180 |  |  |
| Vitamin D3 (i.u.) |  | 400 | 250 | 250 |  |
| Vitamin C (mg) | 60 |  |  |  | 60 |
| Berberine (mg) |  | 300 |  |  |  |
| Mangiferin (mg) |  | 200 |  |  |  |
| *Acacia* Polyphenols (mg) |  | 250 |  | 250 | 500 |
| β-Boswellic Acid |  |  |  | 500 |  |
| Salicortin (mg) |  |  |  | 200 |  |
| Pycnogenol ™ (mg) |  |  | 100 |  |  |
| *Polypodium* (mg) |  |  |  |  | 500 |
| Creatine (mg) |  |  |  |  | 100 |
| Resveratrol (mg) |  | 100 |  |  |  |
| Calcium (mg) |  |  |  | 150 |  |

Some of the phytonutrient components used herein are pure materials either isolated from natural extracts or synthesized and some components are extracts, which may contain mixtures of active compounds. For example, Pycnogenol™ is a pine bark extract which contains procyanidin compounds; Polypodium (Polypodium leucotomos extract) contains calagualine, a triterpenoid glycoside and several phenolic acids; Acacia contains robinetinidol, fisetinidol, catechin and gallocatechin. In situations where it is convenient and/or cost effective, natural extracts may be substituted for pure compounds without markedly diminishing their effectiveness. For example, mangiferin may be replaced with extracts of *Mangifera indica* (mango) or the genus *Salacia*; beta-boswellic acid by *Boswellia Serrata* extract; salicortin by *Populus balsamifera* or *Salix alba* (white willow) extract. Preferred phytonutrients and other bioactives for use herein are described in more detail below.

Phytonutrients

Among phytonutrients useful in the present invention are the flavonoids and other polyphenols. Flavonoids or bioflavonoids, also known as "phenylchromones," are naturally occurring, water-soluble compounds known to have antioxidant characteristics. Flavonoids are widely distributed in plants and are found in numerous vegetables, fruits and beverages such as tea and wine (particularly red wine) and therefore, are a common component of the human diet. The animal kingdom is unable to synthesize the flavone nucleus; flavonoids are therefore strictly exogenous food components of plant origin.

Flavonoids are conjugated aromatic compounds having the general structure of a 15-carbon skeleton, which consists of two phenyl rings (A and B) and a dihydropyran heterocyclic ring (C). Flavonoids are all ketone-containing compounds, such as flavones and flavonols (also referred to as anthoxanthins). This class was the first to be termed bioflavonoids. The terms flavonoid and bioflavonoid have also been more loosely used to describe non-ketone polyhydroxy polyphenol compounds, which are more specifically termed flavanoids. Flavonoids (specifically flavanoids such as the catechins, and their oligomeric forms, proanthocyanidins) are the most common group of polyphenolic compounds in the human diet and are found ubiquitously in plants. Flavonols, the original bioflavonoids such as quercetin, are also found ubiquitously, but in lesser quantities. The widespread distribution of flavonoids, their variety and their relatively low toxicity compared to other active plant compounds such as some alkaloids mean that humans and animals can ingest significant quantities in their diet. Foods with high flavonoid content include parsley, onions, blueberries and other berries, apples, tea, bananas, all citrus fruits, red wine, and dark chocolate.

As of the mid 1980's more than 4000 chemically unique flavonoids have been identified and this is only a fraction of the total number likely to be present in nature. The most widely occurring flavonoids are flavones and flavonols. While the present invention is open to the use of all flavonoids, flavonols such as myricetin, (3,5,7,3',4',5',-hexahydroxyflavone), quercetin (3,5,7,3',4'-pentahydroxyflavone), kaempferol (3,5,7,4'-tetrahydroxyflavone), and flavones such as apigenin (5,7,4'-trihydroxyflavone) and luteolin (5,7,3',4'-tetrahydroxyflavone) and glycosides thereof are preferred. The main catechins are catechin [(2R,3S)-2-(3,4-dihydroxyphenyl)-3,4-dihydro-2H-chromene-3,5,7-triol], the cis isomer epicatechin (EC), epicatechin gallate (ECG) epigallocatechin-3-gallate (EGCG) and epigallocatechin (EGC). Although all catechins share similar properties, EGCG appears to be most potent. Some other isomers or conjugates may be present in plant sources (with either catechin or epicatechin as a backbone, and varying levels of gallic acids). Other polyphenolic compounds for use herein are structurally not flavonoids, i.e., do not contain the 15-carbon ring structure but contain the phenol functional group and may also contain the ketone group. Examples include magnolol [4-Allyl-2-(5-allyl-2-hydroxyphenyl)phenol]; curcumin [(1E,6E)-1,7-Bis(4-hydroxy-3-methoxyphenyl)-1,6-heptadiene-3,5-dione; hesperitin (5,7,3'-trihydroxy-4'-methoxyflavanone); hesperidin (hesperitin-7-O-rutinoside); mangiferin [(1S)-1,5-anhydro-1-(1,3,6,7-tetrahydroxy-9-oxo-9H-xanthen-2-yl)-D-glucitol]; salacinol [(2S,3S)-4-[(2R,3S,4S)-3,4-dihydroxy-2-(hydroxymethyl) thiolan-1-ium-1-yl]-1,3-dihydroxybutan-2-yl] sulfate]; kotalanol [(2S,3S,4R,5R,6S)-1-[(2R,3S,4S)-3,4-dihydroxy-2-(hydroxymethyl)thiolan-1-ium-1-yl]-2,4,5,6,7-pentahydroxyheptan-3-yl] sulfate]; resveratrol (3,5,4'-trihydroxy-trans-stilbene; oleuropein [methyl (4S,5E,6S)-4-[2-[2-(3,4-dihydroxyphenyl)ethoxy]-2-oxoethyl]-5-ethylidene-6-[(2S,3R,4S,5S,6R)-3,4,5-trihydroxy-6-(hydroxymethyl)oxan-2-yl]oxy-4H-pyran-3-carboxylate]; Fisetinidol [(2R,3S)-2alpha-(3,4-Dihydroxyphenyl)-3,4-dihydro-2H-1-benzopyran-3beta,7-diol]; Robinetinidol [(−)-5-[(2R)-3,4-Dihydro-3beta,7-dihydroxy-2H-1-benzopyran-2alpha-yl]-1,2,3-benzenetriol]. These flavonoids and other polyphenols are preferred because each agent provides multiple biologic, therapeutic and health activities/benefits. Other phytonutrients having different chemical structures from the above flavonoids and polyphenols but having therapeutic activities are also useful herein such as certain alkaloids like berberine [5,6-dihydro-9,10-dimethoxybenzo[g]-1,3-benzodioxolo[5,6-a]quinolizinium]. Another agent of interest is the fern extract commonly known as Polypodium, which has powerful antioxidant and anti-inflammatory activities and has been reported as useful for protecting skin tissue. *Polypodium leucotomos* (correctly *Phlebodium aureum*) extract contains calagualine and phenolic acids such as 3,4-dihydroxybenzoic acid, 4-hydroxybenzoic acid hydroxycinnamic acids. Because the present formulations use a combination of the above natural compounds having multiple activities, smaller amounts of each active are sufficient for therapeutic effectiveness while minimizing potential dose-dependent side effects. In addition, synergy is achieved with certain combinations. Some preferred phytonutrients are described in more detail below.

Quercetin

A preferred flavonoid for use in the invention is quercetin, which is found in many fruits and vegetables, but highest levels are found in apples, cranberries, onions, kale and broccoli. Like many other bioflavonoids, quercetin has been promoted for its anti-oxidant, anti-inflammatory, anti-atherogenic, cardioprotective, and anti-carcinogenic properties. Quercetin is ingested from the daily diet, and also widely marketed as a dietary supplement in the U.S. and Europe at doses ranging from 500 to 2000 mg per day. Beneficial effects of quercetin supplements have been reported in clinical trials. Evaluation by the International Agency for Research on Cancer (IARC) concluded that quercetin is not classified as carcinogenic to humans. Quercetin has received GRAS (Generally Recognized As Safe) status, and no side-effects have yet been noted in doses of a few grams a day in either humans or animals. Quercetin may be also supplied in the present compositions as its glycosides including rutin (quercetin-3-O-rutinoside), quercitrin (quercetin 3-rhamnoside), isoquercetin (quercetin-3-glucoside aka isoquercitrin) and alpha-glycosyl isoquercetin (aka EMIQ or Enzymatically Modified Isoquercitrin). The glycosides are preferred for use herein because of their greater water solubility and absorbability and thus bioavailability as compared to quercetin itself.

It is believed that quercetin, which exhibits some of the strongest antioxidant effects of the flavonoids and which has been reported to inhibit oxidation and cytoxicity of low density lipoproteins (LDL), may have beneficial health consequences since oxidized low density lipoproteins are reported to be atherogenic, i.e., they contribute to the buildup of fatty substances in the arterial wall. Lipid peroxidation is caused by free radicals such as reactive oxygen species (ROS). Free radicals are molecules with at least one unpaired electron, which makes them highly reactive. Free radicals are continually formed in the metabolic processes of the human body but are tightly regulated. Human plasma contains various antioxidants which makes it difficult for such reactions to occur within the plasma. When LDL is within the arterial wall, the situation is different and the plasma antioxidant protection is not available. The reaction that can result in buildup of oxidized lipids in the arterial wall can be stopped or decreased by the presence of an antioxidant such as a flavonoid. Flavonoids appear to act by protecting LDL against oxidation, as they inhibit the generation of lipid peroxides and also may help protect alpha-tocopherol (vitamin E), a major lipophilic antioxidant carried in lipoproteins, from being consumed by oxidation in LDL. The activity of quercetin and other phytonutrients that is beneficial against vascular calcification and cardiovascular diseases are discussed in related U.S. Pat. No. 1,564,084 filed on Jul. 13, 2017.

With regard to T2DM, quercetin, as well as other flavonoids and polyphenols (e.g., magnolol and honokiol, psi-baptigenin, apigenin, hesperidin, amorfrutins, and catechins) have been shown to function as potent agonists to peroxisome proliferator activated protein receptor gamma (PPAR-γ) [See e.g., Wang L., et al. (2014). "Natural product agonists of Peroxisome proliferator-activated receptor gamma (PPAR-γ): a review". *Biochemical Pharmacology* 92: 73-89]. PPAR-γ agonists such as the synthetic TZDs have been used to treat diabetes; however, there are safety concerns with their use. Other quercetin actions that are beneficial against T2DM include decreasing fasting plasma glucose, improving glucose tolerance and regeneration of the pancreatic islets. These effects are accomplished by (1) inhibiting glucose and fructose absorption by lowering GLUT2 and inhibiting α-glucosidase activity; (2) enhancing glucose uptake in muscle and heart by upregulating GLUT4; (3) stimulating AMP activated protein kinase (AMPK), which induces GLUT4 and enhances insulin sensitivity; (4) improving insulin sensitivity by inducing adiponectin expression; (5) increasing insulin secretion by preventing pancreases oxidative damage; and (6) increasing glucose storage in the liver by enhancing glucokinase activity.

Quercetin activities that are beneficial against obesity include (1) reducing the number of adipocytes, by inhibiting adipogenesis through the activation of AMPK signaling pathway and reducing the expression PPAR-γ in adipose tissue; (2) inhibiting the expression of sterol regulatory element-binding protein (SREBP-1), which promotes fatty acid synthase (FAS) lipogenesis; (3) increasing lipolysis by inhibiting phosphodiesterase (PDE); (4) increasing fatty acid oxidation/thermogenesis by activating AMPK and enhancing adiponectin expression; (5) inducing pre-adipocytes apoptosis by enhancing caspase 3; (6) reducing glucose uptake by inhibiting GLUT4 in adipocytes and GLUT2 in small intestine; (7) inhibiting fatty acid synthesis in adipose tissue and liver, inducing fatty acid oxidation in heart and muscle, and promoting insulin secretion in pancreas through stimulating the AMPK signaling pathway; and (8) reducing oxidative damage by quenching reactive oxygen species (ROS) and enhancing production of endogenous antioxidants.

These activities of quercetin have been documented in several studies. [See e.g. Aguirre L, et al (2011). "Beneficial Effects of Quercetin on Obesity and Diabetes". *The Open Nutraceuticals Journal*, 4:189-198; Zhou J, et al. (2014). "Isoquercitrin activates the AMP—activated protein kinase (AMPK) signal pathway in rat H4IIE cells". *Complementary and Alternative Medicine*, 14:42; González-Castejön M, and Rodriguez-Casado A (2011). "Dietary Phytochemicals and their Potential Effects on Obesity". *Pharmacological Research* 64: 438-455; Baboota R K, et al. (2013). "Functional food ingredients for the management of obesity and associated co-morbidities A review". *Journal of Functional Foods*, 5: 997-1012; Chen S, et al. (2016), "Therapeutic Effects of Quercetin on Inflammation, Obesity, and Type 2 Diabetes". *Mediators of Inflammation*. 2016:5 pp; Dong J, et al. (2014), "Quercetin reduces obesity-associated ATM infiltration and inflammation in mice: a mechanism including AMPKα1/SIRT1". *J Lipid Res*. 55(3): 363-374.]

Quercetin and other polyphenols such as curcumin and magnolol also possess potent antibacterial activity in addition to their anti-oxidant and anti-inflammatory properties. For example, potent activity against oral pathogens responsible for gingivitis and periodontitis has been documented in published studies supporting their use in oral care formulations to help control gum disease. Some polyphenols are more active than others and some combinations do better than single agents. These polyphenols are active in killing bacteria as well as in controlling biofilm maturation and growth. The beneficial effects of quercetin and other polyphenols against inflammatory processes and immune responses are also well established, thereby enhancing their therapeutic potency. In vitro studies using different cells have shown that quercetin can inhibit production of inflammatory cytokines such as IL-6, IL-8 and TNF-α from human cultured mast cells and immunoglobulin E (IgE)-mediated release of histamine. [See e.g., Shahzad M et al. (2015), "Selected dietary (poly)phenols inhibit periodontal pathogen growth and biofilm formation". *Food. Funct.*, 6: 719; Palaska I, et al. (2013), "Use of Polyphenols in Periodontal Inflammation". *European J. of Pharmacology* 720: 77-83; Min Y D, et al. (2007), "Quercetin inhibits expression of inflammatory cytokines through attenuation of NF-kappaB and p38 MAPK in HMC-1 human mast cell line". *Inflamm. Res.* 56(5): 210-5; Theoharides T C, et al. (2001), "Anti-inflammatory actions of flavonoids and structural requirements for new design". *International Journal of Immunopathology and Pharmacology*, 14(3):119-127; Kimata S, et al. (2000), "Effects of luteolin, quercetin and baicalein on immunoglobulin E-mediated mediator release from human cultured mast cells". *Clinical & Experimental Allergy*, 30(4): 501-508; Askari G, et al. (2012), "The effect of quercetin supplementation on selected markers of inflammation and oxidative stress". *J. Res. Med. Sci.*, 17(7): 637-641.]

Curcumin

Curcumin is a yellow-orange pigment obtained from the plant *Curcuma longa* (turmeric) by making a powder of the dried rhizomes of the plant. It is a common ingredient in curry powders and has a long history of use in traditional Asian medicine and cooking. It is sold as an herbal supplement, cosmetics ingredient and as food flavoring and food coloring, thus being safe for human consumption. It is listed as food additive E100 in European Commission. "Food Additives". (2014 Feb. 15). Two preliminary clinical studies in cancer patients consuming high doses of curcumin (up to 8 grams per day for 3-4 months) showed no toxicity, though some subjects reported mild nausea or diarrhea. In vitro tests suggest curcumin has quite a large safety threshold. [See e.g., Goel A; et al. (2008). "Curcumin as "Curecumin": From kitchen to clinic". *Biochemical Pharmacology* 75 (4): 787-809; Hsu C H and Cheng A L (2007), "Clinical studies with curcumin". *Advances in Experimental Medicine and Biology* 595: 471-4801

In addition to its antibacterial activity along with quercetin, curcumin has also been demonstrated to have potent antifungal activity against 23 fungi strains including *Candida* species at a fairly low concentration and to have an inhibitory effect on the adhesion of *Candida* species to human buccal epithelial cells. Since the adhesion of microorganisms to host mucosal surfaces is a prerequisite for colonization and infection, these results indicate that curcumin is a promising lead antifungal agent with none of the many side effects associated with the restricted number of commercially available antifungal drugs. [Martins C V B, et al. (2008), "Curcumin as a promising antifungal of clinical interest". *Journal of Antimicrobial Chemotherapy*, 63:2, 337-339.] The broad antimicrobial activity of curcumin along with its anti-inflammatory and antioxidant effects makes it applicable in many cosmetic, skin and hair care products. Examples include anti-dandruff shampoos, anti-aging skin creams, exfoliating cleansers, and anti-acne treatment. [See e.g., Mukherjee P K, et al. (2011), "Bioactive compounds from natural resources against skin aging". *Phytomedicine*, 19:64-73; Shimatsu A, et al. (2012), "Clinical Application of Curcumin, A Multi-Functional Substance". *Anti-Aging Med.*, 9(1): 43-51.]

Other areas of interest as it pertains to curcumin are alleviating cognitive decline associated with aging, being heart healthy by both electrical means and reducing lipid and plaque levels in arteries, and both reducing the risk of diabetes and being a good treatment for the side-effects associated with diabetes.

Consequently, curcumin is marketed as a supplement worldwide at concentrations ranging from 400-1000 mg. The European Food Safety Authority has concluded that curcumin when taken orally as food additive is safe for children age 1-10 years at dosages of 3 mg/kg body weight/day. Furthermore, the WHO made a recommendation that curcumin is safe for adults when taken at 150 mg/day. Also, the US FDA issued GRAS status to Curcumin C3 Complex produced by Sabinsa Corp. for use in food and beverage products.

Curcumin inherently is poorly absorbed when orally ingested by itself; thus bioavailable or absorbable forms are preferred for use in the present compositions. For example, the combination of curcumin with a small amount of piperine has been shown to increase the bioavailabity of curcumin 20-fold. [Shoba G, et al. (1998), "Influence of piperine on the pharmacokinetics of curcumin in animals and human volunteers". *Planta Med.* 64(4):353-6.] Other bioavailable forms of curcumin include a phospholipid-curcumin complex marketed as Meriva™ or Longvida™; a nanoparticulate emulsion such as Theracurmin™; a mixture of curcuminoids in their natural ratio found in turmeric prepared using a molecular dispersion process (CurcuWIN™); and a curcumin+turmeric essential oil mixture known as BCM-95 (BIOCURCUMIN™). [See e.g., Sunagawa Y, et al. (2015), "Colloidal Submicron Particle Curcumin Exhibits High Absorption Efficiency—A Double-Blind, 3-Way Crossover Study". *J. Nutr. Vitaminol.* 61:37-44]

With regard to its activity to prevent and control diabetes and obesity, the mechanism of action of curcumin is somewhat similar to that of quercetin, just like for vascular calcification. Both inhibit inflammatory responses and reduce oxidative stress. Curcumin has also been demonstrated to help reduce blood glucose level, increase insulin sensitivity, restore insulin secretion, and prevent insulin resistance glucose resistance. Curcumin induces AMPK activity which then results in increase glucose uptake via GLUT4 and suppression of gluconeogenesis. With regard to obesity, curcumin inhibits pre-adipocyte differentiation via activation of AMPK and Wnt/β-catenin signaling and down-regulating the expression of PPAR-γ, C/EBPα, and SREBP-1 in adipocytes. Curcumin suppresses lipogenesis and promotes lipolysis and thermogenesis by activation of the same signaling pathways and down regulating expression of fatty acid synthase (FAS) and SREBP-1. Curcumin also induces adiponectin production in adipose tissue, which promotes fat oxidation, glucose uptake and insulin sensitivity. [See e.g. Zhang D, et al. (2013). "Curcumin and Diabetes: A Systematic Review". *Evidence Based Complementary and Alternative Medicine;* 2013/636053; Wang S, et al. (2014). "Novel insights of dietary polyphenols and obesity". *J. Nutr. Biochem.* 25(1): 1-18; Ghorbani Z, et al. (2014), "Anti-Hyperglycemic and Insulin Sensitizer Effects of Turmeric and Its Principle Constituent Curcumin". *Int. J. Endocrinol. Metab.* 12(4):e18081; González-Castejón M, and Rodriguez-Casado (A2011), Ibid.; Baboota R K, et al. (2013), Ibid; Ahn J, et al. (2010). "Curcumin-induced suppression of adipogenic differentiation is accompanied by activation of Wnt/-catenin signaling". *Am. J. Physiol. Cell Physiol.* 298: C1510-C1516; Ejaz A, et al. (2009). "Curcumin Inhibits Adipogenes is in 3T3-L1Adipocytes and Angiogenesis and Obesity in C57/BL Mice". *J. Nutr.* 139: 919-925.]

Hesperidin

Hesperidin [hesperitin-7-O-rutinoside or hesperitin-7-O-rhamnosyl(1-6)glucoside] is a flavanone glycoside named after the term "Hesperidium", referring to citrus fruits which are the main source of hesperidin. Hesperidin and its aglycone (hesperitin) are common dietary flavonoids being found in many citrus products and are most well known for being concentrated in orange peels and pericarp. Hesperidin is widely known in traditional Chinese medicine alongside with naringenin as Chimpi, wherein the dried peels of citrus have been used medicinally. The actual active from hesperidin is its aglycone hesperitin (5,7,3'-trihydroxy-4'-methoxyflavanone); thus hesperidin acts like a hesperitin prodrug, i.e., supplies the body with hesperitin. After ingestion, hesperidin is hydrolyzed by gut microflora into aglycone form (hesperetin) and then conjugated mainly into glucuronides. Hesperetin and its metabolites have been reported to have several biological activities, including antioxidant, anti-inflammatory, lipid lowering, cardioprotective and neuroprotective effects; influencing bone strength and osteoblast differentiation; and ameliorating insulin resistance and endothelial dysfunction, among others. Synthetic variants of hesperidin that can be used to supply hesperitin to the body include hesperidin-7,3'-O-dimethylether (HDME), which is more lipid soluble than hesperidin and glucosyl-hesperidin (G-Hesperidin) where the aglycone (hesperitin) is not changed, but the diglycoside group has been modified into a triglycoside. This variant has increased water solubility approximately 10,000-fold relative to hesperidin but ultimately it releases hesperidin (glycone) in the body after being metabolized by intestinal α-glucosidases and then hesperidin can release free hesperitin. Another derivative that may be used to supply hesperidin in formulations is hesperidin methyl chalcone (HMC), which has been demonstrated to have high bioavailabity. Most studies using hesperidin tend to use about 500 mg of supplemental hesperidin, and use the standard form of hesperidin if taking it as a daily preventative.

Hesperidin, as a bioflavonoid, provides antioxidant benefits via enhanced activity and production of cellular antioxidant enzymes such as superoxide dismutase (SOD), heme oxygenase-1 (HO-1), catalase, etc., and elevation of the predominant cellular antioxidant called glutathione [Roohbakhsh A, et al. (2015), "Molecular mechanisms behind the biological effects of hesperidin and hesperetin for the prevention of cancer and cardiovascular diseases". *Life Sci.* 124:64-74; Kalpana K B, et al. (2009), "Evaluation of antioxidant activity of hesperidin and its protective effect on H2O2 induced oxidative damage on pBR322 DNA and RBC cellular membrane". *Mol Cell Biochem.* 323(1-2):21-9].

Often oxidative stress in the body is accompanied by systemic inflammation characteristic of many chronic conditions. Numerous studies indicate that hesperidin and hesperetin are able to reduce various pathologically elevated inflammatory markers. [See e.g., Agrawal Y O, et al. (2014), "Hesperidin produces cardioprotective activity via PPAR-γ pathway in ischemic heart disease model in diabetic rats", *PLOS One* 0111212; Tamilselvam K, et al. (2013), "Anti-oxidant and anti-inflammatory potential of hesperidin against 1-methyl-4-phenyl-1,2,3,6-tetrahydropyridine-induced experimental Parkinson's disease in mice", *Int. J. Nutr. Pharm. Neurol. Dis.* 3:294-302; Xiaoting L, et al. (2010), "Effect of hesperidin on expression of inducible nitric oxide synthase in cultured rabbit retinal pigment epithelial cells". *Adv. Exp. Med. Biol.* 664:193-201.] This inhibitory effect has been predominantly associated with their antioxidant activity and ability to inactivate the pro-inflammatory cascade initiated by free radicals. These compounds were also effective in decreasing the synthesis of pro-inflammatory cytokines e.g. tumor necrosis factor—alpha (TNF-α) as well as pro-inflammatory enzymes such as inducible nitric oxide synthase (iNOS), which yields nitric oxide (NO) and cyclooxygenase-2 (COX-2), which is involved in the production of inflammatory mediators such as prostaglandins.

Hesperidin is also well-known as a cardiovascular protective and strengthening agent. It demonstrates several benefits to the cardiovascular system due to its ability to affect various cellular mechanisms. For instance, due to its antioxidant properties hesperidin can prevent low density lipoprotein (LDL) oxidation and protect the cell membrane of erythrocytes (red blood cells) from oxidative damage. It also acts as an inhibitor of two main enzymes in cholesterol metabolism—HMGCoA reductase and ACAT that regulate total LDL (so called "bad" cholesterol") and "good cholesterol" (high density lipoprotein HDL) levels. While HMG-CoA reductase is a regulatory enzyme in cholesterol biosynthesis and a primary target for statin drugs (cholesterol lowering medication), ACAT catalyzes the intracellular esterification of cholesterol and is also engaged in cholesterol absorption, hepatic secretion of very low density lipoprotein (VLDL) and cholesterol accumulation in the vascular wall [Bok S H, et al. (1999), "Plasma and hepatic cholesterol and hepatic activities of 3-hydroxy-3-methyl-glutaryl-CoA reductase and acyl CoA: cholesterol transferase are lower in rats fed citrus peel extract or a mixture of citrus bioflavonoids". *J. Nutr.* 129(6):1182-5]. Thus, by inhibiting the activity of these two enzymes hesperidin decreases the total "bad" cholesterol (LDL) and increases the "good" cholesterol (HDL). [See e.g., de Oliveira D M, et al. (2013), "Hesperidin associated with continuous and interval swimming improved biochemical and oxidative biomarkers in rats". *J. Int. Soc. Sports Nutr.* 10:27.] A study on rats fed a high cholesterol diet supplemented with flavonoids (hesperidin and naringin) demonstrated inhibition of liver cholesterol biosynthesis (28.3%) and the esterification of hepatic cholesterol (23.7%) by hesperidin. In the same study tangerine peel extract was even more potent by decreasing liver cholesterol synthesis by 37% and its esterification by 32%. These results are in agreement with others, including a human study that demonstrated a marked decrease in triglyceride level after 4 weeks of hesperidin supplementation (using G-Hesperidin, 500 mg/day). [See e.g., Kim H K, et al. (2003), "Lipid-lowering efficacy of hesperetin metabolites in high-cholesterol fed rats". *Clin. Chim. Acta,* 327(1-2):129-37; Miwa Y, et al. (2005), "Glucosyl hesperidin lowers serum triglyceride level in hypertriglyceridemic subjects through the improvement of very low-density lipoprotein metabolic abnormality". *J. Nutr. Sci. Vitaminol.* (Tokyo) 51(6):460-70.]

Another health benefit of hesperidin has been associated with its antihypertensive effect. It is believed that hesperidin is responsible for blood pressure lowering effect of orange juice since it promotes nitric oxide production resulting in vasodilation (widening of blood vessels). Moreover, hesperidin can enhance relaxation of the endothelial cells (cells of the inner blood vessel wall) induced by the neurotransmitter acetylcholine and can inhibit secretion of endothelium-derived vasoconstricting factor endothelin-1 (ET-1) [Morand C, et al. (2011), "Hesperidin contributes to the vascular protective effects of orange juice: a randomized crossover study in healthy volunteers". *Am. J. Clin. Nutr.* 93(1):73-80]. All aforementioned mechanisms aid in blood pressure normalization.

In addition to reducing inflammation and oxidative stress, hesperidin actions relevant to treatment of T2DM include (1) inducing the expression of adiponectin and (2) upregulating activity of hepatic glucokinase, PPAR-Y and adipocyte GLUT4 resulting in lower blood glucose and HBA1c.

[See e.g. Akiyama S, et al. (2010). "Dietary Hesperidin Exerts Hypoglycemic and Hypolipidemic Effects in Streptozotocin-Induced Marginal Type 1 Diabetic Rats". *J. Clin. Biochem. Nutr.,* 46, 87-92; Vinayagam R and Xu B (2015). Ibid.]

Magnolol and Honokiol

Magnolol is an active component isolated from *Magnolia officinalis* (*Magnolia* bark), typically along with its structural isomer, honokiol and also 4-O-methylhonokiol. Both are di-allyl biphenyl diols. The bark is stripped from the stems, branches, and roots of *Magnolia* tree, and the polyphenolic components containing magnolol and honokiol are extracted. *Magnolia officinalis* is widely used in traditional Chinese medicine to facilitate bowel movement and ameliorate abdominal fullness. In past decades, magnolol/honokiol have been characterized as anti-oxidant, anti-depressant, anti-allergic, anti-cancer and anti-microbial agents. The potent antioxidant activities of magnolol and honokiol are thought to be the contribution of hydroxyl and allylic groups on a biphenolic moiety. The hydroxyl group on the biphenolic moiety results in magnolol/honokiol activity against reactive oxygen species, inhibiting cell proliferation and antimicrobial activity. Similar to quercetin, magnolol and honokiol have been demonstrated to have significant antimicrobial activity, for example, against periodontopathic microorganisms such as *Porphyromonas gingivalis, Prevotella gingivalis,* and *Actinobacillus actinomycetemcomitans* and a relatively low cytotoxic effect on human gingival cells, suggesting potential therapeutic use as a safe oral antiseptic for the prevention and the treatment of periodontal disease. [Chang B S, et al. (1998), "Antimicrobial Activity of Magnolol and Honokiol against Periodontopathic Microorganisms". *Planta Medica* 64: 367.]

A series of positive effects on the cardiovascular (CV) system have also been demonstrated for magnolol/honokiol. These effects are mostly attributed to their antioxidant activity. Excessive free radicals induce lipid peroxidation, protein denaturation and DNA damage triggering cell death. In the past 20 years, magnolol has been found to have diverse functions in different cells of the CV system. The cardiovascular protective activities of magnolol are reported to result from attenuating ischemic/reperfusion heart injury, reducing atherosclerotic change and endothelial cell apoptosis, inhibiting neutrophil activation/adhesion and vascular smooth muscle cell proliferation, preventing platelet aggregation and thrombosis, and promoting vessel relaxations. Such cardiovascular protection effects regulated by magnolol are cell-type specific and dose-related. [See e.g., Ho J H-C and Hong, C-Y (2012), "Cardiovascular protection of magnolol: cell-type specificity and dose-related effects". *Journal of Biomedical Science* 19:70.]

Safety testing of magnolol or extracts of *Magnolia* bark has been reported. In a pre-clinical study, oral administration in animals (mice: 0.625-2.5 g/kg; rat: 0.06-0.48 g/kg/day for 21 days or 0.06-0.24 g/kg/day for 90 days) of ethanol extracts (94% magnolol and 1.5% honokiol) of *Magnolia* bark neither induced drug-related side effects nor altered immune response. A randomized, double-blind, placebo-controlled clinical study for weight control among female adults showed that oral administration of capsuled extracts of *Magnolia officinalis* and *Phellodendron amurense* (250 mg, three times a day for 6 weeks) was well tolerated in both healthy and obese patients, and regulation of cortisol only in obese patients was a benefit for weight control. The oral bioavailability of magnolol is reportedly about 4-5%. To reach the therapeutic level through oral administration with 5% of oral bioavailability, 2 mg/kg per day, i.e. daily 120 mg of magnolol for a 60-kg adult, is considered sufficient for cardiovascular protection, and such a dosage is applicable and safe based on the safety studies reviewed by Ho and Hong as cited above.

With regard to diabetes and obesity, the benefit from magnolol results in part from its being a strong agonist of peroxisome proliferator activated receptor gamma (PPAR-γ). Magnolol functions as a PPAR-γ agonist through direct binding to the PPAR-γ ligand binding domain. As discussed above, PPAR-γ agonists such as the drugs troglitazone and rosiglitazone are used to treat diabetes. Magnolol/honokiol (MG/HK) are believed to have the same effect. In addition, the strong antioxidant activity of MG/HK (1000 times more potent than vitamin E) prevents lipid peroxidation and the generation of reactive oxygen species (ROS), which are factors in the development of obesity and T2DM.]. It has been reported that MG reduced fasting blood glucose and plasma insulin levels in type 2 diabetic rats and increased the glucose uptake in 3T3-L1 adipocytes. In addition, both HK and MG stimulated glucose uptake in insulin-sensitive and insulin-resistant murine and human adipocytes via an insulin signaling pathway and protected tissues and cells against a variety of oxidative stressors. It was also reported that 4-O-methylhonokiol (MH), another major bioactive component of *Magnolia* extracts, had anti-inflammatory properties via inhibition of NF-κB pathway in macrophage raw 264.7 cells. In a study of lipid and glucose metabolism in high fat diet-induced obese mice, it was reported that magnolol and honokiol individually and in combination significantly reduced plasma total cholesterol and glucose levels, and improved glucose tolerance, compared with controls. Both also increased expression of the glucose transporter GLUT4 and adiponectin genes in white adipose tissue. Honokiol and magnolol improved hyperglycemia and dyslipidemia and act synergistically when used in combination. [See e.g., Lee J, et al. (2005), "Anti-inflammatory effects of magnolol and honokiol are mediated through inhibition of the downstream pathway of MEKK-1 in NF-κB activation signaling". *Planta Medica* 71(4):338-343; Chiang J, et al. (2009) "Honokiol protects rats against eccentric exercise-induced skeletal muscle damage by inhibiting NF-κB induced oxidative stress and inflammation". European Journal of Pharmacology. 610(1-3):119-127; Alonso-Castro A J, et al. (2011), "*Magnolia dealbata* Zucc and its active principles honokiol and magnolol stimulate glucose uptake in murine and human adipocytes using the insulin-signaling pathway". *Phytomedicine*. 18(11):926-933; Choi S-S, et al. (2009), "Magnolol enhances adipocyte differentiation and glucose uptake in 3T3-L1 cells". Life Sciences. 84(25-26):908-914; Wang L, et al. (2014), "Natural product agonists of Peroxisome proliferator-activated receptor gamma (PPARγ): a review". *Biochemical Pharmacology* 92:73-89; Lee Y-S et al. (2015), "Honokiol, magnolol, and a combination of both compounds improve glucose metabolism in high-fat diet-induced obese mice". *Food Science and Biotechnology.* 24(4): 1467-1474.]

Resveratrol

Resveratrol (3,5,4'-trihydroxy-trans-stilbene) is a stilbenoid, a type of natural polyphenol, produced by several plants. Sources of resveratrol in food include the skin of grapes and berries, peanuts and red wine. Like other plant polyphenols, resveratrol has potent antioxidant and anti-inflammatory activities. These activities among others have been implicated to contribute substantially to the health benefits of resveratrol. Studies have demonstrated resveratrol's capacity to favorably modulate factors involved in a number of disease models, including vascular calcification (VC), cardiovascular disease, diabetes, obesity, systemic inflammation, cancer and neurodegenerative diseases. [See e.g., Baur J A and Sinclair D A (2006). "Therapeutic potential of resveratrol: the in vivo evidence". *Nat. Rev. Drug Discov.* 5: 493-506; Juhasz B, et al. (2010), "Resveratrol: a multifunctional cytoprotective molecule". *Curr. Pharm. Biotechnol.* 11:810-818; Ning Xia, et al. (2017), "Antioxidant effects of resveratrol in the cardiovascular system". British J. Pharmacology, 174(12): 1633-1646; Vogelman B (March 2012), "How Resveratrol Combats Leading Causes of Death". LIFE EXTENSION MAGAZINE; Vang O, et al. (2011), "What is new for an old molecule? Systematic review and recommendations on the use of resveratrol". *PLOS One.* 6(6):e19881.]

With regard to conditions that are associated with obesity and diabetes, resveratrol has been shown to reduce risks for these conditions by targeting multiple factors that set the stage for such. Animal studies in pigs have shown that resveratrol helps mitigate the cholesterol elevations that result from obesity and a high-fat diet by directly regulating expression of genes that control lipid metabolism. Exposure to resveratrol triggers correction of abnormal fatty acid utilization, by inducing mitochondrial enzymes that help break down fat molecules. In pigs with the equivalent of human metabolic syndrome, resveratrol supplementation lowered body mass indices, serum cholesterol, the inflammatory marker C-reactive protein, improved glucose tolerance and endothelial function. [See e.g., Azorin-Ortuno M, et al. (2012), "Effects of long-term consumption of low doses of resveratrol on diet-induced mild hypercholesterolemia in pigs: a transcriptomic approach to disease prevention". *J. Nutr. Biochem.* 23(7):829-37; Bastin J, et al. (2011), "Exposure to resveratrol triggers pharmacological correction of fatty acid utilization in human fatty acid oxidation-deficient fibroblasts". *Hum. Mol. Genet.* 20(10):2048-57; Robich M P, et al. (2011), "Resveratrol modifies risk factors for coronary artery disease in swine with metabolic syndrome and myocardial ischemia". *Eur. J. Pharmacol.* 664 (1-3):45-53.]

Several studies have reported that supplementation with resveratrol reduces blood glucose, increases insulin sensitivity, restores insulin secretion, and prevents glucose resistance. These resveratrol effects arise via (1) increasing adiponectin expression, which improves insulin sensitivity in adipocytes; (2) increasing AMPK activity and SIRT1 thereby enhancing energy expenditure/thermogenesis, which mimics calorie restriction without affecting calorie intake; (3) inducing the expression of GLUT4 thereby increasing glucose uptake; and (4) reducing the expression of inflammatory response (TNF-kB, IL-6, and COX-2) in mature adipocytes. With regard to controlling obesity, resveratrol has been shown to (1) activate AMPK and down regulate the expression of PPAR-γ resulting in decreasing adipocyte differentiation (adipogenesis) and proliferation, (2) activate SIRT1 in addition to AMPK and down regulate expression of FAS and SREBP-1 resulting in lipogenesis inhibition and promotion of lipolysis and thermogenesis; (3) enhance apoptosis; (4) reduce the expression of inflammatory response (TNF-kB, IL-6, and COX-2) in mature adipocytes; and (5) reduce the expression of mediators of reactive oxygen species (ROS) thereby reducing oxidative stress. [See e.g., Vallianou N, et al. (2013). "Resveratrol and Diabetes". *Rev. Diabet. Stud.* 10: 236-242.6; Fischer-Posovszky, P, et al. (2010). "Resveratrol regulates human adipocyte number and function in a Sirt1 dependent manner". *Am. J. Clin. Nutr.* 92:5-15; Wang A, et al. (2011) "Up-regulation of Adiponectin by Resveratrol". *The Journal of*

*Biological Chemistry.* 286: 60-66; Wang S, et al. (2014) Ibid.; Gonzalez-Castejón M, and Rodriguez-Casado (2011) Ibid.; Baboota R K, et al. (2013) Ibid.]

Berberine

Berberine (5,6-dihydro-9,10-dimethoxybenzo [g]-1,3-benzodioxolo[5,6-a]quinolizinium) is found in a handful of plants widely used in botanical medical practice including Goldenseal (*Hydrastis canadensis*), Oregon grape (*Berberis aquifolium*), Barberry (*Berberis vulgaris*), and Chinese Goldthread (*Coptis chinensis*). Two other berberine-containing plants that are familiar to practitioners of Chinese medicine are *Phellodendron chinense* and *Phellodendron amurense*. Berberine is usually prepared from these sources. Berberine is yellow in color, and plants containing berberine often have been used as a dye, particularly for coloring wool. Chemically, berberine is classified as an isoquinoline alkaloid. Among the most common chemical forms of berberine are the hydrochloride, sulfate, citrate and phosphate salts.

The traditional therepeutic use of berberine was as anti-infection or anti-inflammation agent. In China, berberine is an over-the-counter drug for the treatment of bacterial diarrhea. In the late 1980s the hypoglycemic effect of berberine was firstly reported when berberine was prescribed to treat diarrhea in diabetic patients and since then, berberine has been used as an anti-diabetic agent in Chinese folk medicine. Newly published research reports in the last 20 years reveal that berberine may have clinical applications in a range of conditions including metabolic syndrome, inflammation, and cancer. Metabolic syndrome includes hyperglycemia, diabetes, lipid abnormalities, energy imbalances and obesity.

The fundamental mechanism of action underlying berberine's impact on human health is most probably its action on the adenosine monophosphate-activated protein kinase or AMP-activated protein kinase (AMPK). This enzyme acts as a central energy regulatory control switch regulating how energy is produced and used in the body. AMPK induces a cascade of events within cells that are all involved in maintaining energy homeostasis. The AMPK system senses and responds to changes in energy metabolism both on the cellular and the whole-body level. It is via AMPK that low energy status switches cellular metabolism from ATP-consuming anabolic pathways to ATP-producing catabolic pathways. AMPK regulates an array of biological activities that normalize lipid, glucose, and energy imbalances. Metabolic syndrome occurs when these AMPK-regulated pathways are turned off, triggering the above diseases.

AMPK activation was cited early on as an explanation of berberine's ability to improve glucose control in diabetic animals. Berberine increases glucose uptake by muscle fibers independent of insulin levels. Berberine triggers AMPK activation and increases glycolysis, leading to decreased insulin resistance and decreased oxygen respiration. The same mechanism leads to a reduction in gluconeogenesis in the liver. In addition to its activity to activate AMPK, berberine also inhibits α-glucosidase, maltase and sucrase activities; reduces the expression of a number of adipocyte-specific genes including FAS, SREBP-1 and PPAR-γ; and reduces oxidative stress and down-regulates pro-inflammatory responses, all resulting in reduced blood glucose and hemoglobinA1c (HbA1c) levels and increased insulin sensitivity. The same activities and mechanisms reportedly underlie berberine's antiobesity effects and favorable influence on weight loss, i.e., inhibiting adipogenesis and lipogenesis while promoting lipolysis and thermogenesis in adipose tissues and muscle. [See e.g., Lee Y S, et al. (2006). "Berberine, a Natural Plant Product, Activates AMP-Activated Protein Kinase With Beneficial Metabolic Effects in Diabetic and Insulin-Resistant States". *Diabetes,* 55: 2256-2264; Yin J, et al. (2012). "Effects and mechanisms of berberine in diabetes treatment". *Acta Pharmaceutica Sinica B,* 2: 327-334; Wu Y, et al. (2015), "Protective effects of berberine on high fat-induced kidney damage by increasing serum adiponectin and promoting insulin sensitivity". *Int. J. Clin. Exp. Pathol.* 8(11):14486-14492; Yin J, et al. (2008), "Efficacy of Berberine in Patients with Type 2 Diabetes". *Metabolism,* 57: 712-717.]

EGCG

Green tea (from *Camellia sinensis*) is one of the world's most popular beverages consumed at a high rate, especially in Asian countries including Korea, China, and Japan. A population-based, prospective cohort study has shown that green tea consumption is associated with reduced mortality due to all causes and cardiovascular disease as well, and randomized controlled trials have indicated that green tea is effective in decreasing blood pressure, low density lipoprotein cholesterol, oxidative stress, and chronic inflammation. Various studies have shown the beneficial effects of green tea, not only on cardiovascular diseases but also on obesity and T2DM. In a retrospective cohort study performed in Japan, a 33% risk reduction of developing T2DM was found in subjects consuming six or more cups of green tea daily compared to those consuming less than 1 cup per week. Another study reported that Taiwanese subjects who had habitually consumed tea for more than 10 years showed lower body fat composition and smaller waist circumference. Evidences from epidemiological studies thus suggest the possibility of green tea being a strategy for treatment or prevention of obesity and diabetes. [See e.g., Kuriyama S, et al. (2006), "Green tea consumption and mortality due to cardiovascular disease, cancer, and all causes in Japan: the Ohsaki study. *JAMA.* 296:1255-1265; Nantz M P, et al. "Standardized capsule of *Camellia sinensis* lowers cardiovascular risk factors in a randomized, double-blind, placebo-controlled study". Nutrition. 25:147-154; Iso H, et al. (2006), "JACC Study Group. The relationship between green tea and total caffeine intake and risk for self-reported type 2 diabetes among Japanese adults". *Ann. Intern. Med.* 144:554-562; Wu C H, et al. (2003), "Relationship among habitual tea consumption, percent body fat, and body fat distribution". *Obes. Res.* 11:1088-1095; Mackenzie T, et al. (2007), "The effect of an extract of green and black tea on glucose control in adults with type 2 diabetes mellitus: double-blind randomized study". *Metabolism.* 56:1340-1344; Nagao T, et al. (2009), "A catechin-rich beverage improves obesity and blood glucose control in patients with type 2 diabetes". Obesity (Silver Spring. 17:310-317; Hsu C H, et al. (2011), "Does supplementation with green tea extract improve insulin resistance in obese type 2 diabetics? A randomized, double-blind, and placebo-controlled clinical trial". *Altern. Med. Rev.* 16:157-163; Higdon J V and Frei B. (2003), "Tea catechins and polyphenols: health effects, metabolism, and antioxidant functions. *Crit. Rev. Food Sci. Nutr.* 43:89-143; Furuyashiki T, et al. (2004), "Tea catechin suppresses adipocyte differentiation accompanied by down-regulation of PPARgamma2 and C/EBPalpha in 3T3-L1 cells". *Biosci. Biotechnol. Biochem.* 68:2353-2359; Klaus S, et al. (2005), "Epigallocatechin gallate attenuates diet-induced obesity in mice by decreasing energy absorption and increasing fat oxidation". *Int. J. Obes.* (*London*) 29:615-623; Kim H S, et al. (2014). New insights into the mechanisms of polyphenols beyond antioxidant properties; lessons from the green tea polyphenol, epigallocatechin 3-gallates. *Redox Biology,* 2: 187-195; Wang S, et al. (2014), Ibid.; Babu P V A, et al. (2013) Ibid.; Gonzalez-Castejón M, and Rodriguez-Casado (2011), Ibid.; Baboota R K, et al. (2013) Ibid.]

Green tea extract (GTE) has many naturally occurring biological components of which polyphenolic epicatechins (ECs) are predominantly active. These include (−)-epigallocatechin-3-gallate (EGCG), (−)-epigallocatechin (EGC), (−)-epicatechin-3-gallate (ECG), and (−)-EC. The EC and EGC are catechol catechins, EGC and EGCG are pyrogallol catechins, and ECG and EGCG are gallate catechins. The above cited studies revealed that EGCG, the most abundant form of catechin in green tea is the main attributable factor of its beneficial effects. EGCG has been shown to reduce blood glucose and improve glucose tolerance. These benefits are suggested to result from ECGC activities of (1) increasing expression of insulin receptor, insulin secretion, adiponectin and GLUT4, thereby increasing glucose uptake; (2) preventing oxidative distress and inflammation thereby protecting insulin producing β-cells from damage; and (3) inducing AMPK thereby inhibiting glucose absorption and gluconeogenesis.

The antiobesity benefits from EGCG result from (1) down regulating the expression of sterol regulatory element-binding protein (SREBP-1), thereby inhibiting FAS lipogenesis; (2) activating AMPK, adiponectin and sirtuin (SIRT1) thereby promoting thermogenesis and lipolysis; (3) activating Wnt/b-catenin signaling in addition to AMPK and reducing expression of C/EBPα, PPAR-γ and SREBP-1 thereby suppressing adipocyte differentiation and proliferation; (3) Inducing pre-adipocyte apoptosis mediated by Cdk2 and caspase-3; and (4) reducing adipocyte derived inflammation that is associated with insulin resistance.

Salacia

The *Salacia* genus consist of about 120 species (e.g., Salacia *reticulata, Salacia oblonga, Salacia chinensis, Salacia prinoides*), which are widely distributed in Sri Lanka, India, China, Vietnam, Indonesia and other Asian countries. *Salacia reticulata* (SR), known as Kothala himbutu in Sinhalese is widely distributed in Sri Lanka and southern India. It is a large woody climber and its root and stem has been extensively used in Ayurvedic medicine for the treatment of diabetes. It is also believed to contain anti-rheumatic properties and is also used for many skin related ailments in traditional healing practices. *Salacia* species have been studied widely for its presumed hypoglycemic and anti-obesity effects in animal models and humans. Multiple compounds with hypoglycemic effects have been isolated from *Salacia* species. Many triterpenes, hydrocarbons and sitosterol have been isolated from roots and stem barks. The root of several species has been reported to contain mangiferin, kotalanol, and salacinol. Mangiferin is a flavonoid with polyphenolic groups and a glycosidic group. Kotalanol, and salacinol have a polyhydroxy sulfonium sulfate structure. These 3 compounds are believed to be the main bioactives credited for the actions of *Salacia* species. Beyond that, *Salacia* appears to have a fairly unique polyphenolic profile. [See e.g., Li Y, et al. (2008), "*Salacia* root, a unique Ayurvedic medicine, meets multiple targets in diabetes and obesity". *Life Sci.* 82(21-22):1045-9; Matsuda H Y M, et al. (2005), "Antidiabetogenic constituents from *Salacia* species". *J. Trad. Med.* 22(1):145-53; Yoshikawa M M T, et al. (1998), "Kotalanol a potent alpha glucosidase inhibitor with thiosugar sulfonium sulphate structure from antidiabetic Ayurvedic medicine *Salacia reticulata*". *Chem. Pharm. Bull.* 46(8):1339-40; Yoshikawa M N N, et al. (2001), "Polyphenol constituents from *Salacia* species: quantitative analysis of mangiferin with alpha glucosidase and aldose reductase inhibitory activities". Yakugaku Zasshi. 121:5371-8; Medagama A B (2015), "*Salacia reticulata* (Kothala himbutu) revisited; a missed opportunity to treat diabetes and obesity?". *Nutrition Journal* 14:21.]

The evidence available from in vitro, animal and human studies point towards effective reduction of plasma glucose and body weight in subjects treated with *Salacia* extracts. In vitro studies demonstrated the ability of *Salacia* to inhibit intestinal alpha glucosidase. In mouse mesenteric fat, *Salacia* enhances the mRNA expression of hormone sensitive lipase (HSL) and adiponectin; thus increasing lipolysis and reducing insulin resistance respectively. In 3T3-L-1 adipocytes, lipogenesis factors are down regulated and lipolysis factors are up regulated with *Salacia* treatment. Animal studies and clinical trials are consistent in demonstrating improvement of glucose concentrations in the fasted and sugar-loaded states. Clinically significant reductions of HbA1C and plasma insulin are reported with treatment of 6 weeks to 3 months. One clinical trial reported significant reduction of body weight and BMI when *Salacia* is used in combination with vitamin D.

Oleuropein

Olive plant (*Olea europaea*) leaves have been widely used in traditional remedies as well as in human diet as an extract, in herbal tea and in the powder form in the European and Mediterranean countries. Olive leaves extract (OLE) is marketed as a natural nutraceutical with wide-ranging health benefits. Olive leaves contain several different compounds collectively termed as olive biophenols, which impart health and therapeutic properties. The most abundant biophenol is oleuropein, followed by other biophenols such as verbascoside, luteolin, rutin, catechin, and hydroxytyrosol in lower quantities. In recent years, research has focused on the effects of extracts from olive leaves related to the prevention of obesity and diabetes as well as associated conditions such as hypertension, atherosclerosis and other cardiovascular diseases.

For example, animal studies demonstrated that addition of oleuropein to a high fat diet (HFD) decreased body weight gain and improved the lipid profiles in the plasma of mice. These beneficial effects against obesity in mice appear to be mediated, at least in part, through downregulating the expression of molecules involved in adipogenesis (PPAR-γ and C/EBPα) and upregulating the expression of factors (AMPK and Wnt/β-catenin signaling) involved in thermogenesis and fat oxidation in the visceral adipose tissue of HFD-fed mice. Other effects of oleuropein supplementation resulted in significantly lower concentrations of triglyceride, total cholesterol, LDL+VLDL cholesterol, free fatty acids (FFA), glucose, and leptin in the plasma of HFD-fed mice. Other studies have reported that oral administration of oleuropein (as olive leaves extract) decreased serum glucose, hemoglobinA1c (HbA1c), total cholesterol, triglycerides, urea, uric acid, creatinine, aspartate amino transferase (AST) and alanine amino transferase (ALT) and increased serum insulin in diabetic rats. It is hypothesized that the hypoglycemic activity of oleuropein result from stimulating AMP activated protein kinase (AMPK) and inducing GLUT4 resulting in enhanced insulin sensitivity and increased peripheral uptake of glucose. It has also been suggested that the antidiabetic and anti-obesity effects of oleuropein might be due to its antioxidant activity restraining the oxidative stress and inflammation which are widely associated with diabetes and obesity pathologies and complications. [See e.g., Kim Y, et al. (2010), "Hepatoprotective effect of oleuropein in mice: mechanisms uncovered by gene expression profiling". *Biotechnology Journal.* 5(9):950-960; Eidi A, et al. (2009), "Antidiabetic effect of *Olea europaea*

L. in normal and diabetic rats". *Phytotherapy Research.* 23(3):347-350; Gonzalez M, et al. (1992), "Hypoglycemic activity of olive leaf". Planta Med. 58:513-5; Jemai H, et al. "Antidiabetic and antioxidant effects of hydroxytyrosol and oleuropein from olive leaves in alloxan-diabetic rats". *J. Agric. Food Chem.* 57:8798-804; Hadrich F et al. (2016). "Oleuropein activated AMPK and induced insulin sensitivity in C2C12 muscle cells". *Life Sci.* 151:167-73; Lee-Huang S, et al. (2013). "Oleuropein and Related Compounds from Olive Plants Modulate Adipogenesis". *The Open Conference Proceedings Journal.* 4: 113-124; Shen Y, et al. (2014). "Olive Leaf Extract Attenuates Obesity in High-Fat Diet-Fed Mice by Modulating the Expression of Molecules Involved in Adipogenesis and Thermogenesis". *Evidence-Based Complementary and Alternative Medicine,* 2014: 971890, 12 pages; Ebaid G, et al. (2010). "Effects of olive oil and its minor phenolic constituents on obesity-induced cardiac metabolic changes". *Nutrition Journal* 9:46; Qadir N M, et al. (2016) "Antidiabetic Effect of Oleuropein from *Olea europaea* Leaf against Alloxan Induced Type 1 Diabetic in Rats". *Braz. Arch. Biol. Technol. v.* 59: e16150116.]

Acacia Polyphenols (AP)

The Acacia genus of evergreen tree (e.g., *A. mearnsii* or black wattle, *A. catechu, A. mollissima,* and *A. milanoxylon*) is common in Australia, Tasmania, South Africa, eastern Africa and South America. The aqueous extracts of the bark of *A. mearnsii* contain significant amounts of polyphenols, referred to as Acacia polyphenols (AP), whose major components are unique flavan-3-ol oligomers and polymers consisting of 4 or 5 monomeric units, including robinetinidol, fisetinidol, catechin and gallocatechin. Acacia extract has long been used as an astringent and antibacterial to treat stomatitis and diarrhea in Asian countries.

Other therapeutic effects of AP include anti-diabetic and anti-obesity. Early studies have reported that the powdered seeds of Acacia exhibit hypoglycemic actions by increasing insulin secretion in non-diabetic rats and rabbits. In more recent animal studies it was reported that oral doses of an AP preparation significantly inhibited fat accumulation and body weight gain and reduced hyperglycemia and insulin resistance in KKAy mice, model animals for obesity and type 2 diabetes. The AP preparation used in this study was an extract of South African *A. mollissima,* which contains ~80% (w/v) polyphenols with molecular weights ranging from 300 to 3,000 kDa, robinetinidol and fisetinidol being the major content. The parameters that were observed to explain the anti-obesity and anti-diabetic effects of AP include (1) increased mRNA and protein expressions of energy expenditure-related genes in skeletal muscle and liver, thereby increasing energy expenditure; (2) decreased mRNA expression of (a) acetyl-CoA carboxylase (ACC) and fatty acid synthase (FAS), the rate-limiting enzymes of fatty acid synthesis in the liver; (b) SREBP-1c, which controls the expression of these enzymes and (c) PPAR-γ and lipoprotein lipase (LPL), fat intake-related genes, which control fat intake by the liver; (3) increased mRNA expression of adiponectin and decreased mRNA expression of TNF-α in white adipose tissue, thereby inhibiting insulin resistance; and (4) increased mRNA expression of GLUT4 in skeletal muscle, thereby reducing insulin resistance. AP thus reduces hyperglycemia and hyperinsulinemia, not simply through alleviated obesity, but through increased adiponectin secretion and suppressed TNF-α secretion in white adipose tissue, and increased GLUT4 expression in skeletal muscle.

In human clinical trials, the safety and effects of short-term intake of an AP supplement on glucose and insulin responses to an oral glucose tolerance test (OGTT) in otherwise healthy subjects with IGT (impaired glucose tolerance) were evaluated. The AP product used was a tablet-form AP preparation, which contains ~80% (w/v) polyphenols, available commercially as a supplementary diet product in Japan. This trial demonstrated that AP supplement intake for up to 8 weeks significantly reduced (improved) overall glucose and insulin responses to an oral glucose load in the OGTT, indicating a beneficial effect of the AP supplement on glucose homeostasis. Throughout the 8-week intervention period, no AP supplement-related adverse events were reported. The safety of the AP supplement is supported by a previous study demonstrating that a 4-week intake of the AP supplement in daily doses ≤1,000 mg AP was safe in healthy male adults. [See e.g., Ikarashi N, et al. (2011), "Anti-obesity and anti-diabetic effects of acacia polyphenol in obese diabetic KKAy mice fed high-fat diet". *Evid Based Complement Alternat Med.* 2011:952031; Ikarashi N, et al. (2011), "The inhibition of lipase and glucosidase activities by acacia polyphenol". *Evid. Based Complement. Alternat. Med.* 2011:272075; Kataoka T, et al. (2011), "Safety of acacia polyphenol dietary supplement: safety evaluation studies in healthy male adults". *Pharmacometrics.* 80:43-52; Ogawa S, et al. (2013), "Effect of acacia polyphenol on glucose homeostasis in subjects with impaired glucose tolerance: A randomized multicenter feeding trial". *Exp. Ther. Med.* 5(6): 1566-1572; Singh K N, et al. (1976), "Hypoglycaemic activity of *Acacia catechu, Acacia suma,* and *Albizzia odoratissima* seed diets in normal albino rats". *Indian Journal of Medical Research,* 64(5): 754-757; Wadood A, et al. (1989), "Effects of *Acacia arabica* and *caralluma edulis* on blood glucose levels of normal and alloxan diabetic rabbits". *Journal of the Pakistan Medical Association,* 39(8):208-2121

PPAR-γ Modulators

As indicated above, substances that act as ligands of PPAR-γ are useful in the present compositions. Examples include plant lipids such as n-3 and n-6 fatty acids and their derivatives, isoflavones and flavonoids. Dietary lipids include cis-5,8,11,14,17-eicosapentaenoic acid (EPA); cis-4,7,10,13,16,19-docosahexaenoic acid (DHA) and oxidized derivatives such as 4-hydroxy docosahexaenoic acid (4-HDHA) and 4-oxo docosahexaenoic acid (4-oxoDHA); linoleic acid; and eicosadienoic acid. Isoflavones include daidzein, genistein, and glycitein. Flavonoids and other polyphenols that have PPAR-γ modulating activity include quercetin, psi-baptigenin, hesperidin, hesperitin, magnolol, honokiol, EGCG, baicalein and its glucoside baicalin, Cinnamtannin B1 (in cinnamon) and rosmarinic acid (in marjoram). By PPAR-γ modulating activity is meant that the agents herein may function either as activator (up-regulator) or suppressor (down-regulator) of PPAR-γ. Human PPARs including PPAR-γ are expressed in several metabolically active tissues including liver, kidney, spleen, heart, skeletal muscle, large intestine and white and brown fat and are present in many cell types including monocytic, vascular endothelial, and vascular smooth muscle cells. Mediation of metabolic and cellular processes is very complex and depends on the particular tissue(s), cellular condition(s) and stimulated signaling pathway(s) being affected. Thus, in some instances, up-regulation of PPAR-γ activity is beneficial and suppression is beneficial in other instances.

Other Bioactives—Vitamins and Minerals

The present compositions may optionally include (a) vitamins including vitamins A, E, D, C, B2, B1, niacin B12, K (K1, K2) and folic acid and (b) minerals such as Mg, Ca, Zn, Fe, iodine. Magnesium and vitamins C, D and K are preferred components herein.

Magnesium

Magnesium is an essential mineral for the human body. It is involved in many biological reactions in the body, including glucose use, fat synthesis, muscle contraction and in the production and transport of energy and proteins. A diet rich in green, leafy vegetables, legumes, nuts, whole grains and fish is normally sufficient to meet the daily magnesium requirement. However, many people take less than the recommended dietary allowance. Low magnesium levels are often seen with malnutrition, or with the use of diuretic medicines, which can cause excessive losses of magnesium. Low Mg levels have been linked to diseases such as osteoporosis, high blood pressure, clogged arteries, heart disease, diabetes and stroke and magnesium supplements have been administered for these conditions. It has also been reported that increased consumption of magnesium is associated with reduced mortality in adults at high cardiovascular risk. [See e.g., Guasch-Ferre, M, et al (2014), "Dietary Magnesium Intake Is Inversely Associated with Mortality in Adults at High Cardiovascular Risk". *J. Nutr.* 144(1), 55-60.] The major side effect of magnesium is diarrhea, which is more common the higher the dose.

Dosing depends on the indication for which magnesium is being used. It also depends on the type of magnesium compound used, such as the chloride, sulfate, carbonate, oxide, citrate, malate, aspartate, glutamate, taurate and bisglycinate, to name a few. Preferred for use herein include the organic salts and complexes, e.g., citrate and malate and the amino acid chelated Mg complexes, such as magnesium bisglycinate, which is a soluble organic complex of Mg with the amino acid glycine. Amino acid chelated magnesium is highly bioavailable and has no gastrointestinal side effects such as diarrhea. The reported RDA for Mg is 300-400 mg/kg/day, except for people with impaired kidney function. Overall, the risk of magnesium intake at prescribed levels to healthy people is very low. The glycinate salt is readily soluble and allows for a safe level of total salt and glycine to be introduced by this complex.

Importantly, magnesium has been shown to provide benefits against vascular calcification (VC), which is a condition associated with diabetes as a trigger. [See related U.S. Pat. No. 1,564,084 filed on Jul. 13, 2017.]

Both obesity and T2DM are associated with magnesium (Mg) deficits. A chronic latent Mg deficit or an overt clinical hypomagnesemia is common in patients with type 2 diabetes, especially in those with poorly controlled glycemic profiles. Low dietary Mg intake has also been related to the development of type 2 diabetes and metabolic syndrome. The body requires magnesium to absorb and utilize nutrients. Without magnesium the body cannot properly use the fats, proteins and carbohydrates consumed every day. Magnesium is a co-factor of many enzymes involved in glucose metabolism and has an important role in insulin action. Insulin stimulates magnesium uptake in insulin-sensitive tissues. Magnesium is required for both proper glucose utilization and insulin signaling. Metabolic alterations in cellular magnesium, which may play the role of a second messenger for insulin action, contribute to insulin resistance. Conditions like insulin resistance and diabetes are strongly associated with obesity, so controlling blood sugar levels is a key factor in maintaining a healthy weight. When enough magnesium is present in the body, insulin can function properly and blood glucose is used for energy. Magnesium deficiency causes insulin to function poorly, resulting in high blood sugar and fat storage. Thus magnesium supplementation is beneficial toward control and/or prevention of both T2DM and obesity. Studies have shown that indeed magnesium increases insulin sensitivity and also reduces inflammation and oxidative stress. These actions of magnesium contribute to reducing blood glucose and hemoglobinA1c (HbA1c) levels. [See e.g., Balon T W, et al. (1995). "Magnesium supplementation reduces development of diabetes in a rat model of spontaneous NIDDM. *Am. J. Physiol.* 269: E745-52; Barbagallo M and Dominguez L (2015). "Magnesium and Type 2 Diabetes". *World J. Diabetes.* 6: 1152-1157; Dong J Y (2011). "Magnesium Intake and Risk of Type 2 Diabetes". 34: 2116-2122.]

Vitamin D

Vitamin D refers to a group of fat-soluble sterols that are functional in humans for increasing intestinal absorption of calcium, iron, magnesium, phosphate, and zinc. The most important compounds in this group are vitamin D3 (also known as cholecalciferol) and vitamin D2 (ergocalciferol). Cholecalciferol and ergocalciferol can be ingested from the diet and from supplements. However, very few foods contain vitamin D. Synthesis of vitamin D (specifically cholecalciferol) from 7-dehydrocholesterol in the skin of humans and most vertebrate animals by sunlight/UVB radiation exposure is the major natural source of the vitamin. Vitamin D from the diet or dermal synthesis from sunlight is biologically inactive; activation requires enzymatic conversion (hydroxylation) in the liver and kidney. In the liver, cholecalciferol (vitamin D3) is converted to calcidiol (aka 25-hydroxycholecalciferol; ergocalciferol (vitamin D2) is converted to 25-hydroxyergocalciferol (aka 25-hydroxyvitaminD2). Part of the calcidiol from vitamin D3 is converted by the kidneys to calcitriol, the biologically active form of vitamin D. Calcitriol circulates as a hormone in the blood and functions e.g., to regulate the concentration of calcium and phosphate in the bloodstream and to promote the healthy growth and remodeling of bone. Calcitriol also affects neuromuscular and immune function. Most people are not deficient in vitamin D, but they do not have an optimal level of vitamin D either. Due to the many health benefits of vitamin D, supplementation is encouraged if optimal levels are not present in the body. The recommended daily allowance for Vitamin D is currently set at 400-800 IU/day, but this is too low for adults with deficiency. The safe upper limit in the United States and Canada is 4,000 IU/day. Research suggests that the true safe upper limit is 10,000 IU/day. For moderate supplementation, a 1,000-2,000 IU dose of vitamin D3 is sufficient to meet the needs of most of the population. This is the lowest effective dose range. Higher doses, based on body weight, are in the range of 20-80 IU/kg daily.

In addition to its vital role in bone health, vitamin D has also been found to play a role in insulin, glucose, and inflammation regulation and may well be a warning sign for different cardiovascular and endocrine diseases including T2DM. There are vitamin D receptors in almost all the cells in the body, suggesting vitamin D plays a role in most chemical processes including beta cell function and regulation—the cornerstone of diabetes. The beta cells in the pancreas are responsible for producing and secreting insulin. In type 1 diabetes, the beta cells are destroyed by the body's immune system; in T2DM, the beta cells attempt to overproduce insulin due to increasing insulin resistance caused by a variety of factors. Vitamin D is present in beta cells and may affect insulin production and secretion as insulin secretion is dependent on calcium (and calcium absorption is dependent on vitamin D). Some animal studies demonstrated that removing vitamin D receptors, or creating a state of vitamin D deficiency, resulted in less insulin produced when needed; correcting vitamin D status restored proper insulin function. Researchers have also noted a deficiency in vitamin D possibly related to decreased insulin sensitivity, which is seen prior to and post T2DM diagnosis. In addition, vitamin D deficiency has been linked with an increase in parathyroid hormone, or hyperparathyroidism, which decreases insulin sensitivity as well. Thus supplementation to correct vitamin D deficiency may be a strategy for improvement of diabetes management, decreased risk of complications and overall health. [See e.g., Zeitz U, et al. (2003), "Impaired insulin secretory capacity in mice lacking functional vitamin D receptor". *Faseb Journal,* 17(3):509-11; Soares M J, et al. (2011), "Vitamin D and parathyroid hormone in insulin resistance of abdominal obesity: cause or effect?. *European Journal of Clinical Nutrition,* 65:1348-1352; Chiu K C, et al. (2004), "Hypovitaminosis D is associated with insulin resistance and beta cell dysfunction". *Am. J. Clin. Nutr.* 79(5):820-5]

Vitamin D has co-factors that the body needs in order to utilize vitamin D properly. Magnesium is the most important co-factor for vitamin D. In fact, it is common for rising vitamin D levels to exacerbate an underlying magnesium deficiency. As discussed above magnesium deficiency is associated with T2DM and obesity. Research has shown that low serum magnesium levels can be raised with vitamin D supplementation. [Farhanghi M A, et al. (2009), "Obesity induced magnesium deficiency can be treated by vitamin D supplementation". *J. Pak. Med. Assoc.* 59(4):258-61].

Additional Therapeutic Agents

Preferably, the present compositions do not contain additional actives other than the preferred phytonutrients, vitamins and minerals described above since the compositions as formulated with these are therapeutically effective. However, in certain embodiments, the present compositions may comprise additional therapeutic agents to obtain an optimal effect. Thus, for example, the present compositions may comprise an additional agent such as other anti-inflammatory agents, antioxidants, micronutrients and trace elements.

Other anti-inflammatory agents may include, but are not limited to, lipoxygenase inhibitors, such as nordihydroguaiaretic acid; cyclo-oxygenase inhibitors such as flurbiprofen; and non-steroidal anti-inflammatory agents such as aspirin, ketorolac, flurbiprofen, ibuprofen, naproxen, indomethacin, ketoprofen, piroxicam, meclofenamic acid, rofecoxib, celecoxib, and mixtures thereof. If present, the other anti-inflammatory agents generally comprise from about 0.001% to about 5% by weight of the compositions of the present invention.

Modifiers of cell redox status include antioxidants such as N-acetyl cysteine and gallic acid; antioxidant enzyme inducers such as anethole-dithiothione, oltipraz, pyrrolidine dithiocarbamate (PDTC) and indole-3-carbinol. Other micronutrients include Co-enzyme Q10, pyrroloquinoline quinone (PQQ), thiamine, riboflavin, niacin, pantothenic acid, pyridoxine, choline, biotin, inositol, para-aminobenzoic acid. Trace elements include manganese, chromium, molybdenum, copper, selenium and combinations thereof.

Composition Use

A safe and effective amount of the compositions of the present invention comprising the combination of phytonutrients and minerals and/or vitamins is typically administered to a subject having or at risk of developing weight problems and/or T2DM preferably from about once to four times per day, more preferably from about once to three times per day, even more preferably from about once per day to about twice per day. The period of such treatment typically can range from about one day to a lifetime. The subject may be any person or animal in need of treatment or prevention. By "animal" is meant to include in particular household pets or other domestic animals, or animals kept in captivity.

Since the present compositions are aimed toward normalizing metabolism and energy expenditure and managing oxidative stress and inflammation, they are also beneficial in relation to physical activity, in particular performance, endurance, fatigue and recovery during intensive and/or continuous exercise/exertion or athletic activities.

Endurance performance during high intensive exercises is mainly determined by the capacity of the aerobic metabolism. It generally induces muscle fatigue defined as the reversible decline in skeletal muscle contractile performance. Fatigue is multifactorial and is often associated with many physiological parameters including reduced neural input and disruptive metabolic changes in skeletal muscles such as lactic acidosis and the production of oxidative free radicals. Moreover, it could lead to oxidative stress as a result of an imbalance between reactive oxygen species (ROS) production and intrinsic antioxidant defense. Therefore, improving performance and endurance would benefit from maintaining proper aerobic metabolism and inhibiting oxidative stress. The present compositions provide these benefits. Specifically, the present compositions activate both AMPK and Glut4. As discussed above, AMPK is a metabolic master switch that regulates downstream signals based on shifts in the surrounding energy reservoir. On activation, AMPK signals through its downstream substrates to achieve energy homeostasis by stimulating fatty acid oxidation and glucose transport, while inhibiting the opposing actions of fatty acid synthesis and protein synthesis. Thus, the net effect of AMPK activation is an increased cellular energy level via the inhibition of anabolic energy-consuming pathways, as well as the stimulation of catabolic, energy-producing pathways. Beyond energy homeostasis, AMPK plays a major role in glucose homeostasis by modulating glucose transport in peripheral tissues, in particular skeletal muscle. AMPK stimulates glucose uptake in skeletal muscle cells via increased expression of enzymes specialized in glucose uptake such as GLUT4 and hexokinase II. Moreover, AMPK directly phosphorylates the GLUT4 enhancer factor that is essential in the regulation of GLUT4 expression. Overall, these sequential alterations in the expression of enzymes involved in glucose uptake are the ultimate result of AMPK activation, which stimulates catabolic processes that counter the deleterious effects of glucose excess and maintains energy homeostasis. The importance of activating intracellular signaling pathways that involve AMPK and Glut4 to improve endurance capacity during exercise was demonstrated in a mouse study. This study found that that mice administered a black tea polyphenol combined with exercise training could run longer distances and for a longer time compared with the exercise only group. Intake of the polyphenol combined with exercise training increased phosphorylation of AMPK and mRNA level of glucose transporter 4 (GLUT4). [Eguchi T, et al. (2013), "Black Tea High-Molecular-Weight Polyphenol Stimulates Exercise Training-Induced Improvement of Endurance Capacity in Mouse via the Link between AMPK and GLuT4". pone.0069480]

Many other animal and human studies have demonstrated the benefits from various flavonoids and polyphenols on physical activity particularly on athletic performance enhancement and sports nutrition. Among the phytonutrients that have been studied and found to be effective are quercetin, resveratrol, curcumin, green tea extract (GTE) and EGCG. Supplementation with these actives has been shown to correlate with prevention of aerobic exercise-induced muscle damage and inflammation, performance and endurance capacity. As discussed above, these phytonutrients exert a variety of biological activities often related to their antioxidant and anti-inflammatory nature, such as decreasing C-reactive protein, IL-6, and other cytokines and inflammatory biomarkers. In addition, these substances modulate a variety of biological and physiological processes including metabolic homeostasis, mitochondria biogenesis and skeletal muscle function. In animal studies, polyphenols including catechins, resveratrol, quercetin, and curcumin have been shown to activate sirtuins (especially SIRT1). SIRT1 activation modulates these processes. An animal study showed that 7 days quercetin treatment (12.5 or 25 mg/kg b.w.) increases the expression of genes associated with mitochondrial biogenesis (PPAR-γ coactivator, PGC-1a and SIRT1), mitochondrial DNA content, and cytochrome-C concentration, both at muscle and brain levels in mice. Beside these biological data, quercetin-treated mice showed a significantly increased maximal endurance capacity (higher time to fatigue) and voluntary wheel-running activity, in a treadmill running test, compared with their placebo-treated counterparts. Another study found that treatment of 4-8 week-old male C57BL/6J mice with 0.4% (w/w) resveratrol significantly increased their aerobic capacity, as evidenced by an increased running time and higher oxygen consumption by muscle fibers via activation of SIRT1 and PGC1. Such effects are similar to the fatigue-resistant effect observed with tea polyphenols, such as ECGC. [See e.g., Myburgh K H, (2014), "Polyphenol Supplementation: Benefits for Exercise Performance or Oxidative Stress?". *Sports Med.* 44 (Suppl 1): 57-70; Malaguti M, et al. (2013), "Polyphenols in Exercise Performance and Prevention of Exercise-Induced Muscle Damage". *Oxidative Medicine and Cellular Longevity*, 2013:825928, 9 pages; Davis J M, et al. (2010), "The dietary flavonoid quercetin increases $VO_{2max}$ and endurance capacity". *Int. J. Sport Nutr. Exerc. Metab.* 20(1):56-62; Lappalainen Z, (2011), "Sirtuins: a family of proteins with implications for human performance and exercise physiology, *Research in Sports Medicine.* 19(1); 53-65; Davis J M, et al. (2009), "Quercetin increases brain and muscle mitochondrial biogenesis and exercise tolerance". *American Journal of Physiology*, 296(4): R1071-R1077; Nieman D C, et al. (2010), "Quercetin's influence on exercise performance and muscle mitochondrial biogenesis". *Medicine and Science in Sports and Exercise*, 42(2): 338-345; Nieman D C, et al. (2009), "Effects of quercetin and egcg on mitochondrial biogenesis and immunity". *Medicine and Science in Sports and Exercise,* 41(7):1467-1475; Haramizu S, et al. (2011), "Catechins attenuate eccentric exercise-induced inflammation and loss of force production in muscle in senescence-accelerated mice". *Journal of Applied Physiology,* 111(6):1654-1663; Murase T et al. (2005), "Green tea extract improves endurance capacity and increases muscle lipid oxidation in mice". *American Journal of Physiology,* 288(3): R708-R715; S. Sae-Tan S, et al. (2011), "(−)-epigallocatechin-3-gallate increases the expression of genes related to fat oxidation in the skeletal muscle of high fat-fed mice". *Food and Function,* 2(2):111-116; Murase T, et al. (2009), "Suppression of the aging-associated decline in physical performance by a combination of resveratrol intake and habitual exercise in senescence-accelerated mice". *Biogerontology,* 10(4), 423-434; Lagouge M, et al, (2006), "Resveratrol improves mitochondrial function and protects against metabolic disease by activating SIRT1 and PGC-1α". *Cell.* 127:1109-1122.]

The present compositions preferably comprise magnesium in combination with three or more of phytonutrients selected from quercetin, rutin (quercetin-3-O-rutinoside), curcumin, hesperidin, hesperitin, magnolol/honokiol, amorfrutins, resveratrol, EGCG, oleuropein, *Salacia* extract (source of mangiferin, salacinol and kotalanol), and Acacia polyphenols (source of robinetinidol, fisetinidol, catechin and gallocatechin) as active agents. The concentrations of the actives in the present compositions and delivered dosage of individual agents will vary depending on the type/form of composition, the intended purpose, and the gender and target age groups. Generally, each phytonutrient will be present at least about 5 mg in the composition, at least about 10 mg in some embodiments and at least about 50 mg in other embodiments. Generally each phytonutrient will be present up to about 3000 mg. However, since the present compositions contain a combination of these phytonutrients having multiple activities, only smaller amounts of each phytonutrient are used. For example, the preferred daily dose range for quercetin is from about 10 mg to about 3,000 mg, more preferably from about 300 mg to about 2,200 mg, even more preferably from about 500 mg to about 1,500 mg. For curcumin, the preferred daily dosage is from about 10 mg to about 1,500 mg, more preferably from about 300 mg to about 1,300 mg and even more preferably about 500 mg to 1000 mg. For magnolol/honokiol the preferred daily dosage is from about 5 mg to about 500 mg, more preferably about 15 mg to about 350 mg and even more preferably about 100 mg to about 300 mg. For hesperidin, the preferred daily dose is from about 5 to about 1000 mg, more preferably about 50 to about 500 mg and even more preferably about 75 to about 300 mg. For magnesium, the preferred daily dosage is from about 50 mg to about 1000 mg, more preferably from about 100 mg to about 500 mg and even more preferably from about 200 mg to about 400 mg. For Vitamin D the preferred daily dosage is from about 200 mg to about 800 mg, preferably from about 250 mg to about 400 mg. The compositions may be formulated for daily, weekly or monthly dosing. Preferably the compositions are formulated for daily dosing taken 1 to 4 times a day for ease of compliance in easy to swallow pills and capsules, chews, drink mixes and beverages.

The following non-limiting examples further describe preferred embodiments within the scope of the present invention. The examples are given solely for illustration and are not to be construed as limitations of this invention as many variations thereof are possible without departing from the spirit and scope thereof.

EXAMPLES

Example I. Efficacy Testing of Dietary Supplements

The benefits from the present compositions are demonstrated in (1) an in vitro study and using 3T3-L1 mouse embryonic pre-adipocyte cells to assess the effect of phytonutrients and magnesium/vitamins on adipogenesis and fat accumulation and (2) an in vivo feeding study using an animal model with male C57BL/KsJ-db/db mice to assess the effect of phytonutrients and mineral/vitamins on diabetes. The treatment products in each study comprise as actives magnesium and phytonutrients individually and in combination. Additionally, the treatment product may include. vitamin D and/or vitamin C.

The experimental procedure in the in vitro adipogenesis study is as described in the literature with some modification. [Ahn J, et al. (2010). "Curcumin-induced suppression of adipogenic differentiation is accompanied by activation of Wnt/-catenin signaling". *Am. J. Physiol. Cell Physiol* 0.298:

C1510-C1516]. Fat accumulation and differentiation to adipocytes will be evaluated by using Oil red O staining and quantified using a spectrophotometer.

The experimental procedure in the feeding study is as described in the literature with some modification. [Kim J H et al. (2011). "Quercetin attenuates fasting and postprandial hyperglycemia in animal models of diabetes mellitus". *Nutrition Research and Practice* 5(2):107-111; Seo K, et al. (2008) "Effect of curcumin supplementation on blood glucose, plasma insulin, and glucose homeostasis related enzyme activities in diabetic db/db mice". *Mol. Nutr. Food Res.* 52(9):995-1004] Parameters measured include fasting blood glucose level, blood HbA1c level, blood insulin concentration and homeostatic index of insulin resistance (HOMA-IR).

The dimensions and values disclosed herein are not to be understood as being strictly limited to the exact numerical values recited. Instead, unless otherwise specified, each such dimension is intended to mean both the recited value and a functionally equivalent range surrounding that value. For example, a value or amount disclosed as "40 mg" is intended to mean "about 40 mg".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A composition effective to prevent and treat diabetes and/or obesity in human and other mammalian subjects, said composition comprising:
   about 200 mg magnesium (Mg) mineral supplied as a malate compound or complex;
   about 30 mg isoquercetin;
   about 60 mg curcumin;
   about 100 mg resveratrol; and
   about 100 mg epigallocatechin-3-gallate (EGCG),
   wherein the composition is sufficient to modulate blood glucose levels and HbA1c levels.

2. The composition according to claim 1 further comprising one or more of vitamins selected from vitamins A, E, D, C, B2, B1, niacin B12, K, and folic acid or of minerals selected from Ca, Zn, Fe, and iodine.

3. The composition according to claim 1 further comprising at least about 5 mg of one or more phytonutrients selected from the group consisting of oleuropein; catechin; epicatechin (EC); epicatechin gallate (ECG); epigallocatechin (EGC); genistein; daidzein; myricetin; hesperitin; hesperidin; magnolol; honokiol; kaempferol; psi-baptigenin; apigenin; luteolin; amorfrutins; robinetinidol; fisetinidol; berberine; Polypodium; salicortin acacia; and glycosides or gallates thereof.

4. The composition according to claim 3 further comprising one or more of vitamins selected from vitamins A, E, D, C, B2, B1, niacin B12, K, and folic acid or of minerals selected from Ca, Zn, Fe, and iodine.

5. The composition according to claim 1 formulated as a dietary or nutritional supplement in a form selected from capsules, tablets, pills, gummies, gelcaps, granules, powder, teas, drink mixes and beverages.

6. A method of treating and/or preventing obesity and/or diabetes conditions in a human or other mammalian subject having or at risk of developing said conditions comprising administering to said subject a composition according to claim 1, wherein the composition modulates blood glucose levels and HbA1c levels in said subject.

7. The method according to claim 6, wherein the composition further comprises one or more of vitamins selected from vitamins A, E, D, C, B2, B1, niacin B12, K, and folic acid or of minerals selected from Ca, Zn, Fe, and iodine.

8. The method according to claim 6 wherein the composition further comprises oleuropein; catechin; epicatechin (EC); epicatechin gallate (ECG); epigallocatechin (EGC); genistein; daidzein; myricetin; hesperitin; hesperidin; magnolol; honokiol; kaempferol; psi-baptigenin; apigenin; luteolin; amorfrutins; robinetinidol; fisetinidol; berberine; Polypodium; salicortin; or glycosides or gallates thereof.

9. The method according to claim 8, wherein the composition further comprises one or more of vitamins selected from vitamins A, E, D, C, B2, B1, niacin B12, K, and folic acid or of minerals selected from Ca, Zn, Fe, and iodine.

10. The method according to claim 6, wherein the composition is administered as a dietary or nutritional supplement in a form selected from capsules, tablets, pills, gummies, gelcaps, granules, powder, teas, drink mixes and beverages.

11. The method according to claim 10, wherein the composition is administered one to four times daily.

12. A method of improving performance, endurance and/or recovery during strenuous physical and athletic activities comprising administering to subjects involved in said activities, a composition comprising a combination of active agents according to claim 1 having biological activities that together effectively regulate the biochemical processes and mechanisms involved in systemic metabolic and energy homeostasis, wherein the biological activities provided by the combination of active agents include (1) modulating expression and/or activity of one or more of peroxisome activated protein receptor gamma (PPAR-γ), CAAT/enhancer binding protein-α (C/EBPα) and Sterol Regulatory Element-Binding Protein (SREBP-1); (2) activating Wnt/β-catenin pathway; (3) activating the adenosine monophosphate-activated protein kinase (AMPK) signaling pathway; (4) inhibiting the activity of pro-oxidants including reactive nitrogen species and reactive oxygen species (ROS); (5) suppressing one or more of inflammatory mediators including interleukins IL-1α, IL-1β, IL-6, NF-κB, TNF-α, matrix metalloproteinases (MMPs) and prostaglandin E2 (PGE2); (6) enhancing glucose transporter (GLUT4) and/or inhibiting glucose transporter GLUT2; (7) inducing the expression of and/or activating adiponectin and (8) inducing the expression of and/or activating sirtuin (SIRT1).

\* \* \* \* \*